United States Patent
Manglik et al.

(10) Patent No.: US 10,678,602 B2
(45) Date of Patent: Jun. 9, 2020

(54) APPARATUS, SYSTEMS AND METHODS FOR DYNAMIC ADAPTIVE METRICS BASED APPLICATION DEPLOYMENT ON DISTRIBUTED INFRASTRUCTURES

(75) Inventors: Gaurav Manglik, Mountain View, CA (US); Tianying Fu, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 359 days.

(21) Appl. No.: 13/489,223

(22) Filed: Jun. 5, 2012

(65) Prior Publication Data
US 2012/0239739 A1      Sep. 20, 2012

Related U.S. Application Data

(63) Continuation-in-part of application No. 13/024,302, filed on Feb. 9, 2011, now Pat. No. 8,862,933.
(Continued)

(51) Int. Cl.
| | |
|---|---|
| *G06F 15/16* | (2006.01) |
| *G06F 9/50* | (2006.01) |
| *G06F 11/34* | (2006.01) |
| *G06F 8/61* | (2018.01) |
| *G06F 11/14* | (2006.01) |

(52) U.S. Cl.
CPC .............. *G06F 9/5077* (2013.01); *G06F 8/61* (2013.01); *G06F 11/3409* (2013.01); *G06F 11/1438* (2013.01); *G06F 2201/815* (2013.01)

(58) Field of Classification Search
CPC ........... G06F 11/1438; G06F 11/13409; G06F 2201/815; G06F 8/61; G06F 9/5077; G06F 11/3409; H04L 41/5045; H04L 67/10

USPC ....... 709/202, 203, 224, 226, 222, 228, 223, 709/229, 225; 717/101, 174, 170;
(Continued)

(56) References Cited

U.S. PATENT DOCUMENTS

| | | | |
|---|---|---|---|
| 6,718,535 | B1 * | 4/2004 | Underwood .................. 717/101 |
| 7,028,218 | B2 | 4/2006 | Schwarm et al. |

(Continued)

OTHER PUBLICATIONS

"Third-Party Submission under 37 CFR 1.290 Concise Description of Relevance," filed in U.S. Appl. No. 14/497,196, filed Feb. 18, 2015.

*Primary Examiner* — Tonia L Dollinger
*Assistant Examiner* — Schquita D Goodwin
(74) *Attorney, Agent, or Firm* — Behmke Innovation Group LLC; James M. Behmke; James J. Wong

(57) ABSTRACT

Embodiments of apparatus, systems and methods facilitate the adaptive deployment of a distributed computing application on at least one selected cloud configuration from a plurality of cloud configurations based on dynamically obtained and/or compiled metrics pertaining to the cloud configurations and to the distributed computing application and/or user specified criteria pertaining to the metrics. In some embodiments, an infrastructure independent representation of the distributed computing application is adapted to the selected cloud configuration and run on the selected cloud configuration by utilizing a cloud-specific implementation of the infrastructure independent representation of the distributed computing application. The cloud-specific implementation of the infrastructure independent representation corresponds to the cloud infrastructure on which the distributed application is run.

23 Claims, 7 Drawing Sheets

Related U.S. Application Data

(60) Provisional application No. 61/501,726, filed on Jun. 27, 2011.

(58) Field of Classification Search
USPC ............... 718/104, 1; 713/1, 151; 714/3; 370/242; 705/7, 10; 707/103
See application file for complete search history.

(56) References Cited

U.S. PATENT DOCUMENTS

| | | | |
|---|---|---|---|
| 7,100,195 B1* | 8/2006 | Underwood | G06F 9/451 726/2 |
| 7,437,464 B1* | 10/2008 | Xu | H04L 67/02 709/227 |
| 7,523,190 B1* | 4/2009 | Bickerstaff et al. | 709/224 |
| 7,809,975 B2 | 10/2010 | French et al. | |
| 7,849,350 B2 | 12/2010 | French et al. | |
| 7,853,767 B2 | 12/2010 | Maki et al. | |
| 8,090,979 B2 | 1/2012 | Watanabe et al. | |
| 8,176,208 B2 | 5/2012 | Shishido et al. | |
| 8,250,215 B2 | 8/2012 | Stienhans et al. | |
| 8,386,839 B2 | 2/2013 | Watanabe et al. | |
| 8,417,938 B1* | 4/2013 | Considine | H04L 41/12 713/151 |
| 8,489,918 B2 | 7/2013 | Watanabe et al. | |
| 8,904,005 B2 | 12/2014 | Ferris et al. | |
| 9,462,056 B1* | 10/2016 | Protopopov | H04L 67/2838 |
| 9,495,222 B1* | 11/2016 | Jackson | G06F 9/52 |
| 2002/0013895 A1* | 1/2002 | Kelley et al. | 713/1 |
| 2002/0120741 A1 | 8/2002 | Webb et al. | |
| 2004/0076161 A1* | 4/2004 | Lavian | H04L 47/10 370/395.41 |
| 2004/0098458 A1 | 5/2004 | Husain et al. | |
| 2005/0289536 A1* | 12/2005 | Nayak et al. | 717/174 |
| 2006/0212590 A1* | 9/2006 | Parks | G06F 21/608 709/229 |
| 2006/0225073 A1* | 10/2006 | Akagawa | G06F 9/52 718/1 |
| 2007/0083650 A1* | 4/2007 | Collomb et al. | 709/224 |
| 2007/0260702 A1 | 11/2007 | Richardson et al. | |
| 2008/0086501 A1* | 4/2008 | Levine | G06F 17/30569 |
| 2008/0270617 A1* | 10/2008 | Gatev | 709/228 |
| 2008/0288941 A1* | 11/2008 | Adams | G06F 9/45558 718/1 |
| 2009/0216975 A1 | 8/2009 | Halperin et al. | |
| 2009/0293022 A1* | 11/2009 | Fries | G06F 1/206 716/132 |
| 2009/0300151 A1* | 12/2009 | Friedman et al. | 709/222 |
| 2010/0042720 A1* | 2/2010 | Stienhans et al. | 709/226 |
| 2010/0061250 A1* | 3/2010 | Nugent | 370/242 |
| 2010/0070319 A1* | 3/2010 | Prafullchandra et al. | 705/7 |
| 2010/0088150 A1* | 4/2010 | Mazhar et al. | 705/10 |
| 2010/0125476 A1* | 5/2010 | Yeom et al. | 705/7 |
| 2010/0125844 A1* | 5/2010 | Mousseau et al. | 718/1 |
| 2010/0131592 A1* | 5/2010 | Zhang | G06F 9/5044 709/203 |
| 2010/0180275 A1* | 7/2010 | Neogi | G06F 1/3203 718/1 |
| 2010/0191796 A1* | 7/2010 | Almeida et al. | 709/202 |
| 2010/0228819 A1* | 9/2010 | Wei | 709/203 |
| 2010/0235830 A1 | 9/2010 | Shukla et al. | |
| 2010/0325199 A1* | 12/2010 | Park | G06F 16/10 709/203 |
| 2011/0131335 A1* | 6/2011 | Spaltro | G06F 9/5072 709/228 |
| 2011/0185292 A1 | 7/2011 | Chawla et al. | |
| 2011/0213884 A1* | 9/2011 | Ferris | G06F 9/50 709/226 |
| 2011/0320821 A1 | 12/2011 | Alkhatib et al. | |
| 2012/0005342 A1* | 1/2012 | Deng | G06F 9/5044 709/225 |
| 2012/0016721 A1* | 1/2012 | Weinman | G06Q 10/06 705/7.35 |
| 2012/0047239 A1* | 2/2012 | Donahue | G06F 9/5072 709/220 |
| 2012/0054731 A1* | 3/2012 | Aravamudan | G06F 8/63 717/170 |
| 2012/0084445 A1* | 4/2012 | Brock | G06F 9/5077 709/226 |
| 2012/0131578 A1* | 5/2012 | Ciano | G06F 9/45558 718/1 |
| 2012/0131591 A1* | 5/2012 | Moorthi et al. | 718/104 |
| 2012/0137285 A1* | 5/2012 | Glikson | G06F 9/4856 718/1 |
| 2012/0158803 A1 | 6/2012 | Kandasamy et al. | |
| 2012/0159459 A1 | 6/2012 | Turner et al. | |
| 2012/0179820 A1 | 7/2012 | Ringdahl et al. | |
| 2012/0179824 A1* | 7/2012 | Jackson | G06F 9/5027 709/226 |
| 2012/0203823 A1 | 8/2012 | Manglik et al. | |
| 2012/0254966 A1 | 10/2012 | Parker | |
| 2012/0290702 A1* | 11/2012 | Vincent | G06F 9/45558 709/223 |
| 2012/0331528 A1 | 12/2012 | Fu et al. | |
| 2013/0151598 A1 | 6/2013 | Fu et al. | |
| 2013/0332519 A1* | 12/2013 | Walker | H04L 67/10 709/203 |
| 2014/0040656 A1* | 2/2014 | Ho et al. | 714/3 |
| 2014/0068073 A1* | 3/2014 | Peles | G06Q 10/0639 709/224 |
| 2014/0372533 A1 | 12/2014 | Fu et al. | |
| 2015/0039770 A1 | 2/2015 | Manglik et al. | |
| 2015/0121078 A1 | 4/2015 | Fu et al. | |

* cited by examiner

APPARATUS, SYSTEMS AND METHODS FOR DYNAMIC ADAPTIVE METRICS BASED APPLICATION DEPLOYMENT ON DISTRIBUTED INFRASTRUCTURES

CROSS REFERENCES TO RELATED APPLICATIONS

This application is a continuation-in-part of co-pending U.S. patent application Ser. No. 13/024,302 filed Feb. 9, 2011, entitled "Apparatus, Systems and Methods for Deployment and Management of Distributed Computing Systems and Applications, which is now U.S. Pat. No. 8,862,933. This application also claims the benefit of and priority to: U.S. patent application Ser. No. 13/024,302 filed Feb. 9, 2011, entitled "Apparatus, Systems and Methods for Deployment and Management of Distributed Computing Systems and Applications," which is now U.S. Pat. No. 8,862,933, and U.S. Provisional Application No.: 61/501,726 filed Jun. 27, 2011, entitled "Apparatus, Systems and Methods for Optimal Deployment and Management of Distributed Computing Systems and Applications," which are hereby incorporated by reference in their entireties for all purposes.

BACKGROUND

Field of the Invention

The present invention relates to the field of distributed computing and in particular, to apparatus, systems, and methods to dynamically and adaptively deploy applications on distributed computing systems in accordance with user-specified criteria to optimize performance while lowering the cost of deployment.

Description of Related Art

The performance of computing applications may often be increased by distributing the computational workload across nodes in a cluster of computers. A physical cluster of computers is often referred to as a "cloud" or "cloud infrastructure" or simply an infrastructure. Clouds often permit their underlying physical hardware, which can include servers, memory, storage, and network resources, to be viewed as virtualized units. These virtualized units represent some fraction of the underlying computing hardware or resources supported by the cloud. Therefore, from a logical perspective, clouds may be viewed as a collection of virtual machines ("VMs"). A "cloud node" or "node" may be responsible for the control and operation of some fraction of the VMs, and there may be several nodes per cloud.

Increasingly, applications that have been traditionally tied to physical hardware are now being migrated, provisioned and deployed on such virtualized cloud infrastructures. For cloud based applications, virtual machines and virtual clusters are often used to provision cloud based software instead of directly mapping the application to actual physical hardware. In cloud-computing infrastructures that use virtualization, a variety of automated placement strategies and/or techniques are used to dynamically map the virtual resources (such as the virtualized machines, clusters, storage etc.) used by the cloud based application onto the underlying physical hardware. Cloud based applications provisioned with virtualized resources are typically unaware of the corresponding actual physical mapping and allocation of resources.

One drawback of virtualization is that it is difficult to model the performance of applications both (i) on a specific cloud and (ii) when an application migrates from one cloud to another because of the lack of uniformity and the lack of transparency in the placement, allocation, and mapping of virtual resources to corresponding hardware resources in/between clouds.

For example, the performance of an input-output (I/O) intensive distributed application that requires all-node access to shared storage will be cloud-dependent and depend on the method by which the underlying shared storage has been implemented on a cloud. In addition, performance may vary across clouds because a quad-core virtual machine on Cloud A may be very different from a quad-core virtual machine on Cloud B in terms of the actual physical processor cores that will be made available on the respective clouds.

Further, load balancing or placement strategies may contribute to variations in application performance across clouds. For example, as cloud workload increases, Cloud B may see more rapid performance degradation relative to Cloud C because of differences in how the respective clouds distribute virtual machine workload across physical cloud resources. However, application performance may vary even on a specific cloud because the allocation of physical resources to an application may vary based on the total cloud workload. For example, in heavily loaded clouds many virtual machines may be sharing the same physical infrastructure resulting in performance degradation of the applications running on the virtual machines.

With the advent of utility like on-demand public cloud-computing infrastructures, the monetary cost of running applications on clouds creates additional layer of uncertainty because pricing variations between clouds can contribute to a significant cost difference when running an application even when the clouds offer similar application performance. Various other cloud metrics such as security, cloud availability, application uptime, and cloud reliability may also be important to users of public cloud-computing infrastructures.

For a user running a cloud-based application, the lack of transparency in mapping virtual machines to physical resources as well as the differences and variability in performance, features, and pricing between cloud infrastructures creates challenges in the apriori selection of a cloud and a configuration within that cloud that balances various user criteria and delivers optimal price-performance.

Therefore, there is a need for apparatus, systems, and methods to dynamically and adaptively deploy applications on distributed computing systems in accordance with user-specified criteria to optimize performance while lowering deployment cost.

SUMMARY

Consistent with embodiments disclosed herein, apparatus, systems and methods for dynamically and adaptively deploying applications optimally on distributed computing systems in accordance with user-specified metrics based criteria are presented. In some embodiments, a method for selecting at least one of a plurality of cloud configurations to adaptively deploy at least one distributed computing application may comprise: dynamically obtaining metrics information from a subset of the plurality of the cloud configurations, wherein the metrics information comprises real time metrics information for the subset; and selecting at least one of the plurality of cloud configurations based on at least one of: the dynamically obtained real time metrics information for the subset, or compiled metrics information for the plurality of cloud configurations, or calculated metrics for the plurality of cloud configurations, wherein the calculated metrics are based in part on the dynamically obtained real time metrics information for the subset and the compiled metrics information for the plurality of cloud configurations.

Embodiments also relate to software, firmware, and program instructions created, stored, accessed, or modified by processors using computer-readable media or computer-readable memory. The methods described may be performed on processors, various types of computers, and computing systems—including distributed computing systems such as clouds.

These and other embodiments are further explained below with respect to the following figures.

DETAILED DESCRIPTION

In accordance with embodiments disclosed herein, apparatus, systems and methods for dynamically and adaptively deploying applications optimally on distributed computing systems in accordance with user-specified metrics based criteria are presented.

Figure 1:
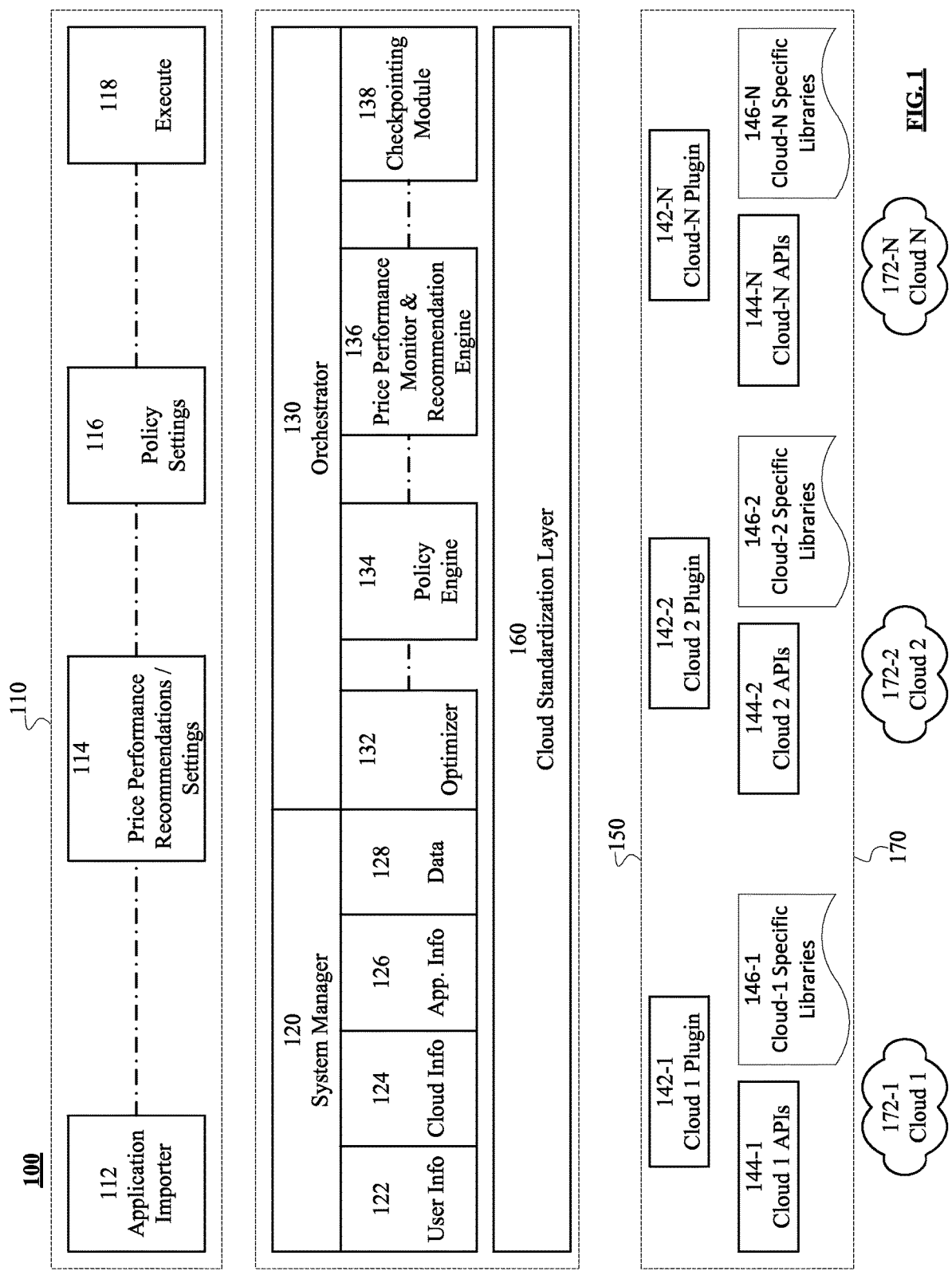
FIG. 1 illustrates portions of an exemplary architecture of a system consistent with disclosed embodiments for deploying and/or migrating applications to distributed systems including clouds.

FIG. 1 illustrates portions of an exemplary architecture of system 100 consistent with disclosed embodiments for deploying and/or migrating applications to distributed systems including clouds.

As shown in FIG. 1, architecture of system 100 can include exemplary User Interface Layer 110, Cloud Provisioning and Management Layer 150, and Cloud Application Deployment Layer 170. Exemplary User Interface Layer 110 may facilitate user configuration of system 100 and may comprise Application Importer Module 112, Price-Performance Recommendation and Setting Module 114, Policy Setting Module 116, and Execute Module 118. User Interface Layer 110 may also comprise various other modules to facilitate system configuration indicated by dashed lines between modules in the block depicting User Interface Layer 110.

Exemplary Cloud Provisioning and Management Layer 150 may facilitate the management of cloud resources, prepare applications for deployment on one or more clouds, and may include Cloud Standardization Layer 160. In some embodiments, Cloud Standardization Layer 160 may include functionality to facilitate standardization of library constructs (such as shared storage, network, cluster, security, etc.) across a variety of cloud providers. Although cloud providers may have provider-specific Application Programming Interfaces (APIs) and other infrastructure differences, Cloud Standardization Layer 160 may provide applications a cloud agnostic or a cloud infrastructure-independent view of resources, including compute, storage and network resources. For example, Cloud Standardization Layer 160 can be a repository for various functional modules that permit applications to utilize various resources (including shared storage, server types, clusters and features such as queues, security, etc.) on each cloud in a cloud-agnostic manner.

In some embodiments, Cloud Standardization Layer 160 may maintain resource standardizations for various clouds, such as exemplary clouds 172-1, 172-2 . . . 172-N, as well as references to cloud-specific implementations of the standardizations for each cloud 172. In some embodiments, exemplary Cloud Standardization Layer 160 may also maintain service-level agreements (SLAB), capability information about each cloud resource, information pertaining to cloud availability, reliability, and security, and performance and pricing information. Information may be maintained by Cloud Standardization Layer 160 by using metadata XML files or databases, which, in some implementations, may be persistent. For example, for a cloud instance, the pricing information stored may include: a) Price-per-Hour, b) Price Granularity, c) Reservation Price, and/or d) Auction Price. In some implementations, the capability information can be stored as {key, value} pairs in a database. Because individual clouds may have different capabilities for a standardized resource type, capability information may be indexed by cloud.

Exemplary Cloud Provisioning and Management Layer 150 may also include exemplary Orchestrator module 130 and System Manager module 120. In some embodiments, System Manager 120 may manage user information and coordinate various user tasks with Orchestrator 130. For example, System Manager 120 may receive, maintain, and update user information 122, cloud information 124, application information 126, and other data 128 such as job history, housekeeping information etc. In some embodiments, System Manager 120 may also facilitate user views of application files and data on shared storage, may move the application files and data to cloud storage, and synchronize the application files and data between clouds.

In some embodiments, System Manager 120 may serve as a storehouse and manager of information pertaining to user activities. For example, System Manager 120 may act as a management layer to initiate and manage application deployment and monitoring activities. In one embodiment, System Manager 120 may interact with modules in User Interface Layer 110 in order to facilitate the performance of management tasks on applications that may have been initiated by the user through User Interface Layer 110. Management tasks facilitated by System Manager 120 may include, for example, initiating application deployment, configuring user and cloud accounts, specifying policies for application runs, and specifying base metrics around desired application price and performance.

In addition the System Manager 120 may also manage automated tasks, which, in some embodiments, may have been initiated by Orchestrator 130. System Manager 120 may also call or invoke functions implemented by Orchestrator 130 in order to perform various system related activities. In some embodiments, System Manager 120 may maintain, a relational database or data repository with information pertaining to system users including user authentication and authorization information; a list of clouds (172-1, . . . 172-N) and available cloud configurations for each cloud 172-*i*; information pertaining to applications, and policies that a user may have specified.

In some embodiments, Orchestrator 130 may use a common application representation to deploy and run a given application on any cloud, irrespective of implementation differences pertaining to the provisioning and utilization of application resources on the individual clouds, in part, by using functionality provided by Cloud Standardization Layer 170. In some embodiments, Orchestrator 130 may include a cloud coordinator or gateway.

In some embodiments, the common application representation may take the form of application descriptors (not shown), which may be input to Orchestrator 130. In some embodiments, a user may specify applications to import using Application Importer module 112 and application descriptors, which may include various primitives such as pattern and system primitives, may be used to describe applications to Cloud Standardization Layer 170.

The pattern and system primitives may describe the execution patterns as well as node, storage, communication and network characteristics pattern and system primitives. Exemplary application descriptors can include information such as: application software and hardware requirements, application profile (whether memory intensive, Input-Output intensive, CPU intensive, etc.), specification of a distributed computing paradigm, application steps (for workflow style applications). These primitives, Orchestrator 130, and cloud coordinator/gateway have also been described in greater detail in co-pending U.S. patent application Ser. No. 13/024,302 filed Feb. 9, 2011, entitled "Apparatus, Systems and Methods for Deployment and Management of Distributed Computing Systems and Applications," which has been incorporated by reference in its entirety into the present application.

In some implementations, cloud capability information may be received from other modules, which may be seen as extensions to the cloud abstraction layer. For example, static or dynamic adaptors into the cloud abstraction layer may provide some of the capability information. As another example, a price-performance monitor may be a source of performance related information. In some implementations, the capability information can be stored as {key, value} pairs in a database. The capabilities may be indexed by cloud because individual clouds may have different capabilities for a given standardized resource type. In some implementations, the information stored by the cloud standardization layer may be used by the Optimizer to optimally maintain a cloud resource pool.

Exemplary User Interface Layer 110 includes various end-user modules that permit user customization and configuration of system 100. Exemplary Application Importer Module 112 may facilitate the importation of new applications into system 100. In some embodiments, imported applications may be displayed to users using a "desktop-style" view, where icons representing the various applications are shown to the user in a window or browser tab. In some embodiments, pre-published applications in a marketplace associated with system 100 (for example, applications in an application library or "app store" associated with or supported by system 100 may be imported by users directly onto their desktop view. In some embodiments, Application Importer Module 112 may allow users to license or buy one or more of pre-published applications.

In general, any software application may be imported using exemplary Application Importer Module 112 in User Interface Layer 110. For example, a distributed computing application composed of several sub-components such as a 3-tier web application which includes a database, an application server and the application logic sub-components may be imported using Application Importer Module 112 and subsequently deployed and run on Clouds 172 using one or more of the exemplary modules in Cloud Provisioning and Management Layer 150 and Cloud Application Deployment Layer 170.

For example, the database, an application server and the application logic in the 3-tier web application may be provisioned on different virtual machines. Further, one or more of these three sub-components, which may be scalable complex applications, can be provisioned on multiple nodes. In some embodiments, various other modules in Cloud Provisioning and Management Layer 150 and Cloud Application Deployment Layer 170 may also be used to deploy, run, manage and monitor applications on any of the underlying clouds 172. In some embodiments, Execute Module 118 may provide user interfaces to permit users to select an application, a cloud 172 (from available clouds 172-1, 172-2 . . . 172-N), associate other user configurable settings with the application, and execute the application on the selected cloud 172.

In some embodiments, Policy Settings Module 116 may provide appropriate graphical user interfaces and other features to permits users to set, modify, and/or delete policies, which may be implemented using Policy Engine 134. For example, users may set policies that limit the clouds and/or configurations that specific user(s) and/or application(s) may use, limit the monetary budget available for an application run or a series of runs, etc. In some embodiments, users may be able to tag jobs or applications. In some embodiments, when an application is tagged, the application may be run on a pre-defined tagged cloud configuration with a tag that matches the application's tag.

In some embodiments, Price-Performance Recommendation/Settings Module 114 may provide graphical user-interfaces for users to set performance and/or cost criteria, view performance analytics, select, view, and/or input application profiles and related data, view application runtime history data for various clouds, and/or view system recommendations for running applications based on price-performance criteria.

In addition, as indicated by the dashed lines, User Interface Layer 110 may include several other modules (not shown) to allow users to specify system functionality related to reporting, auditing, billing, and permit viewing of application files and data on shared storage. In some embodiments, functionality specified or configured by the user in User Interface Layer 110 may be implemented by one or more modules in the Cloud Provisioning and Management Layer 150, Cloud Application Deployment Layer 170, which, in some implementations, may include software agents running on a server and/or on the various clouds. These software agents may monitor application runtime statistics, collect cloud related information such as but not limited to cloud load information, pricing information, security information etc., and/or collect information related to user actions. For example, the data collected for each application run may include but is not limited to: the time of the application run, cloud name where the application was run, cloud configuration for the application run, the pricing of that configuration, machine type, cluster size, storage size, memory size, network backbone type, storage implementation, data pertaining to success/failure/abnormal termination and cause, latency (length of an application run), throughput (number of transactions or requests), cost, etc.

Various other functions may be provided by User Interface Layer 110 For example, Reporting may provide analytical reports and runtime statistics over and above price-performance data. The reports may be diced and sliced based on user, application and/or other criteria. Auditing may use agent monitoring to track user actions and report them. Billing may track the price of each job for invoicing to the customer. Modules in User Interface Layer 110 may also allow users to set permissions and other attributes on application and storage files in order to facilitate sharing and collaboration with other users.

In some embodiments, Orchestrator 130 may facilitate the deployment, running, and monitoring of applications on various clouds. For example, Orchestrator 130 may dynamically build clusters on a selected cloud 172 for application execution in response to an execute command entered by a user using an interface presented by Execute module 118. In some embodiments, Orchestrator module 130 may interact with Optimizer 132, Policy Engine 134, Price Performance Monitor and Recommendation Engine 136, Checkpointing Module 138 and various other modules (not shown) depicted by the dashed line between the listed modules. For example Orchestrator 130 may maintain routines and other program code that implement algorithms for deploying, optimizing, managing and monitoring application runs on clouds. Tasks performed by Orchestrator 130 on Clouds 172 may be facilitated by Cloud Standardization Layer 160. For example, functionality provided by Cloud Standardization Layer 160 permits Orchestrator 130 to use infrastructure independent representations of application code to deploy applications. In some embodiments, the infrastructure independent or cloud independent application code may be common across all clouds 172 because the Cloud Standardization Layer 160 uses cloud specific Plugins, APIs and Cloud Specific Libraries to perform tasks for Orchestrator 130 on any given cloud 172-n.

In some embodiments, routines and other functions performed by Orchestrator 130 may be managed and initiated by the System Manager 120. Orchestrator 130 may also report back the status and results of the various orchestration activities to System Manager 120. In one embodiment, Orchestrator 130 may directly query System Manager for information such as application data, policies, and cloud information. In an exemplary implementation, the Orchestrator may locally cache a subset of the data used for current deployment activities in a relational or a non-relational database (such as NoSQL) in order to reduce query latency, when obtaining such data from System Manager 120.

Policy Engine 134 may help enforce customer, user, and/or administrator policies. For example, Policy Engine 134 may enforce policies set by users through Policy Setting Module 116 that specify uptime criteria for clouds and/or applications that may be candidates for an application run, or the maximum budget per user over some period, or maximum application runtime on a cloud 172. In some embodiments, Policy Engine 134 may interact with Orchestrator 130, Optimizer 132, Price Performance Monitor and Recommendation Engine 136 and various other modules and agents to enforce policies.

In some embodiments, Optimizer 132 may comprise an extensible platform that supports a variety of optimization techniques and works in conjunction with other modules to realize efficiencies. For example, Optimizer 132 may include modules or agents to negotiate or bid on cloud prices based on information (such as a user set maximum price) received from Policy Engine 134, or a price recommendation received from Price Performance Monitor and Recommendation Engine 136. Clouds often offer features such as spot prices, etc which may be based on current and projected demand for compute needs. In some embodiments, Optimizer 132 may take advantage of such pricing schemes to pre-reserve resources at lower costs. Resources may be pre-reserved at attractive pricing based on an application's execution history, and/or based on historical resource usage and projections for system 100.

In some embodiments, Optimizer 132 may include a resource pool manager module which may collect and make available unused time on clouds 172. Typically, cloud pricing is based on some time granularity. For example, clouds may charge by the hour for the use of cloud resources. Thus, if an application completes a run prior to the expiry of the hour, then those cloud resources that were previously allocated to the application may be available for the remainder of the hour for allocation to other applications. In some embodiments, Optimizer 132 may sort data received from resource pool manager module in order of earliest expiry time so that resources that expire sooner may be allocated to other applications before resources that expire at a later point in time.

Accordingly, in some embodiments, Optimizer 132 may facilitate the return of unexpired resources on a cloud-provider that have already been paid-for to the resource pool, so that they can then be re-used by incoming application jobs that arrive prior to cloud resource lease-expiry. Unused resources that have expired may be decommissioned and retired from the pool thereby avoiding costs associated with the maintenance of these resources on cloud provider(s). A resource expires when the time-period for which the resource was reserved or leased ends.

In some embodiments, Optimizer 132 may utilize information such as capability and pricing information available through Cloud Standardization Layer 170 and Price Performance Monitor and Recommendation Engine 136 to maintain a resource pool to ensure that appropriate capabilities are obtained from the cloud provider resources at suitable pricing levels.

In some embodiments, Optimizer 132 may use cloud capabilities and pricing information to intelligently make available resources for use by Orchestrator module 130 during actual application deployment, scale up/scale down and during cluster tear down. For example, when a request to tear down a resource comes in, the resource may be returned to the resource pool if it is unexpired instead of tearing it down on the cloud-provider. On the other hand, resources that have expired, or are within some time threshold of expiry may be torn down. Similarly, when resources are first requested and allocated to an application, Optimizer 132 may allocate available resources from the resource pool before requesting and reserving resources from the cloud provider.

In some embodiments, Optimizer 132 may facilitate maintenance of cloud nodes and storage during an application run on Clouds 172. By provisioning applications in a dynamic manner, so that resources are provided to the application when requested and released back to the resource pool or to the cloud after use, resource utilization may be optimized and cloud fees minimized.

In some implementations, the deployment and running of applications and the dynamic management of clusters and other cloud resources may be facilitated by Cloud Application Deployment Layer 170. Cloud Application Deployment Layer 170 may include Cloud Plugins 142, Cloud APIs 144 and Cloud Specific Libraries 146.

In some embodiments, the dynamic management of clusters and other cloud resources may be facilitated by using a node management service running on a "cloud coordinator/gateway" or "gateway" (not shown) for a specific cloud 172. The gateway may also maintain Cloud APIs 144, such as Cloud-1 APIs 144-1, Cloud-2 APIs 144-2, etc., as well as Cloud specific Libraries 146, such as Cloud 1 Specific Libraries 146-1, Cloud 2 Specific Libraries 146-2, etc. The node management service may act as an intermediate layer between the cloud provider and the cloud orchestrator code and facilitate the addition or removal of nodes.

Cloud Specific Libraries 146 and Cloud APIs 144 may comprise a library of implementations for primitives and composite interfaces, respectively, for a specific cloud 172. In some embodiments, Cloud APIs 144 and Cloud Specific Libraries 146 may be invoked using Cloud Plugins 142. For example, Cloud Plugins 142 may be used to invoke appropriate Cloud APIs 144 and routines from Cloud Specific Libraries 146 that permit the deployment and running of applications on Clouds 172, where the applications may have been described using application descriptors and standardized primitives from Cloud Standardization Layer 160.

In some embodiments, when an application is to be deployed, a gateway may use Cloud APIs 144 and Cloud Specific Libraries 146 library to perform deployment and execution tasks for its cloud 172. For example, shared storage primitives on Cloud Standardization Layer 160 may lead to launching of a DFS shared storage implementation on an Amazon™ cloud, while launching the shared storage implementation on a Terremark™ cloud will set up NAS/SAN. In some embodiments, the gateway may also launch one or more agents, which can be deployed on nodes on Clouds 172, to monitor and report task status back to the gateway.

In some embodiments, Checkpointing Module 138 may periodically save application state so that an application can be restarted if it terminates (or is terminated). The restarting can proceed from any one of the saved states, such as the last saved state. For example, when running chip-simulations for design verification and simulation of Very Large Scale Integration (VLSI) chips and other regression-like applications, an application may be restarted using the saved state from any one of the intermediate saved points thereby resulting in both cost and time savings.

Checkpointing may be valuable in situations where an application terminates without running to completion. An application may terminate (or be terminated) because the user-specified budget or execution-time for the application was exceed, because of cloud-related or other system failures, and for a variety of other reasons. A simple checkpointing policy can be as simple as saving the application state at the end of some specified time period, e.g. checkpointing the application every "x" minutes, and resuming from the last saved state in case of restart.

In some implementations, checkpointing may use machine virtualization and/or application virtualization technologies to save application state. Application virtualization refers to running an application in a virtual container and taking regular memory dumps to obtain cluster snapshots. Snapshots may be taken according to a specified policy—for example, periodically, or when certain usage thresholds are reached. In some implementations, checkpointing policies may be specified using Policy Settings Module 116 and may be implemented as a policy by Policy Engine 134. In other implementations, checkpointing may be implemented as an adapter sub-module to Optimizer 132, and checkpointing sub-module may be invoked by Policy Engine 134 to implement checkpointing related policies.

In some embodiments, Price Performance Monitor and Recommendation Engine 136 may help monitor, collect, and analyze: current real-time and historical metrics, including pricing and various performance metrics obtained from current and prior runs of application jobs on Clouds 172; track historical and current price trends for Clouds 172; and other system and/or user-specified statistical data.

In general, cloud-configuration metrics may comprise dynamically obtained metrics and compiled metrics data, which, in some embodiments, may be stored in Metrics data 365 in database 350. In some embodiments, dynamically obtained metrics data may include real time metrics data. Compiled metrics data may be updated and/or calculated/recalculated using the dynamically obtained metrics data. Cloud-configuration metrics for each cloud-configuration may include data such as, but not limited to: the times of application runs on the cloud configuration; cloud and configuration details pertaining to application runs such as pricing of the cloud-configuration, machine type, cluster size, storage used/available, memory used, network backbone used, queuing technology used, storage implementation, etc.; data pertaining to the success, failures, and abnormal termination rates of applications on the cloud-configuration; throughput (the number of application runs/requests completed in a unit of time); latency; costs, including aggregate and per unit costs; available cloud features, security levels, uptime (the percentage of time that an application is available to service requests), user and system policies at the time of the run.

In some embodiments, compiled cloud-configuration metrics in Metrics Data 365 may be available in aggregate form and may be indexed by cloud, configuration, application, and various other criteria. For example, Metrics Data 365 may include calculated metrics such as averages of, and/or the median number for, a metric (such as latency) for an application or a class of applications for available cloud configurations. In some embodiments, the calculated metric data may be statistical and include metrics that are generalized for: each cloud-configuration, a class of applications, a class of users, and/or indexed by application, user, cloud-configuration, time periods (such as by day of the week, by time of day, by month, etc.).

In addition, Price Performance Monitor and Recommendation Engine 136 may also make cloud configuration recommendations based on price-performance and other user specified criteria and policies. For example, policies specified using Policy Settings Module 116 may be used by Price Performance Monitor and Recommendation Engine 136 in conjunction with price-performance data to make a recommendation to the user and/or to select a cloud 172 to run a user application. For example, if a user specifies that an application run with uptime greater than 99.5% on a cloud 172, then Price Performance Monitor and Recommendation Engine 136 may select a Cloud 172 with an appropriate optimal price-performance profile while ensuring an uptime greater than 99.5% while running the user application. In the above example, in one embodiment, clouds 172 with better price-performance metrics but with uptime lower than the 99.5% threshold may be eliminated as candidates for running the user application by Price Performance Monitor and Recommendation Engine 136.

In some embodiments, Price Performance Monitor and Recommendation Engine 136 may monitor price and performance at the application level (for each application), gateway level (across applications for each customer or client), and management server level (across customers). For example, an agent on each node of a cluster may monitor application runs for individual. The data gathered and reported by the agent at a cluster node may be aggregated and used at the gateway level to monitor to track performance and costs across applications for a user and/or client. In some embodiments, System Manager 120 may aggregate data across users and/or applications by cloud and store the data in a form that may be used by Price Performance Monitor and Recommendation Engine 136, for example, for analytics and recommendation purposes.

Price Performance Monitor and Recommendation Engine 136 may use the data collected to make recommendations about likely costs and the length of time it takes to run an application on a given cloud-configuration. In some embodiments, Price Performance Monitor and Recommendation Engine 136 may also use information in Cloud Standardization Layer 160, which may permit a standardized view of several clouds, as well as data collected by the agents, gateway, and System Manager 120 to present a likely price-performance spectrum showing expected price-performance for application runs on various clouds 172. In some embodiments, a historical price-performance spectrum showing price-performance data for prior application runs may also be displayed to the user. Using the presented price-performance spectrum customers can make informed decisions on cloud and configuration selection, or set policies to permit automatic selection and run on a cloud 172. In some embodiments, for example, Price Performance Monitor and Recommendation Engine 136 may automatically exclude various sub-optimal price-performance configurations based user-settings in Price Performance Recommendations/Settings Module 114 and/or Policy Settings Module 116.

For example, price-performance spectrum may take the form of a chart that displays each application run as a point on a frame of reference with Latency (the length of time to run an application on a specific cloud configuration) as the Y-axis and Monetary Cost-Per-Run for that application as the X-axis. A configuration may be represented by the entire technology stack used to provision the application. For example, cloud configurations may be specified on a price-performance spectrum by using various parameters including (without limitation) server types, storage, network, file system technology, queue technology, cluster size, etc. The chart may be used to provide the customer insight into past application runs and recommendations for future runs. Using the collected and aggregate from agents, gateway and System Manager 120, the price-performance spectrum may be generalized for a class of applications, a class of users, and/or sliced and diced for a single application or user. In some embodiments, the chart may show a Price-Performance Index (PPI) that is also normalized by the data size. For example, PPI may be defined as $$PPI = \frac{1}{\text{latency} * \text{cost}}$$

where latency refers to the time taken to run a software application on a cloud configuration or to service a typical request made to an application deployed on the cloud configuration; and cost measures the monetary cost of an application run or cost per request. The PPI metric helps capture the effective price of a given unit of performance, and helps to normalize price and performance for a given application across cloud configurations for comparison.

Because metrics including price, configurations, and other data may change with time, the price-performance spectrum is dynamic. For example, the level of service from the cloud-provider, availability of better technologies, changing cloud optimization strategies, changed pricing, etc. may contribute to changes in the price-performance spectrum over time. Thus, metrics are dynamically obtained, either continuously, at specified intervals, based on one or more event triggers, such the availability of a new cloud and/or configuration, or prior to deploying/running an application, and/or some combination of the above. In some embodiments, data used in price-performance spectrum representations may be normalized to account for one or more of these changes and permit a more accurate projection or comparison of price-performance data across cloud configurations.

Using system 100, the same application may be deployed on cloud 172-1, 172-2 . . . 172-N seamlessly. Therefore, in situations where dynamic profiling indicates availability of another cloud configuration with a better price-performance profile, system 100 may switch the application deployment to the new cloud seamlessly.

The term adaptive refers to flexibility in deploying a distributed computing application across (i) a variety of clouds or cloud infrastructures and (ii) different configurations within the universe of cloud infrastructures without recoding the applications for each cloud configuration. In some embodiments, adaptive deployment is facilitated by an infrastructure independent representation of the distributed computing application. In some embodiments, cloud-specific implementation of the distributed computing application may be derived from the infrastructure independent representation and the cloud-specific implementation of the distributed computing application corresponding to the selected cloud-configuration may be run on the selected cloud-configuration. For example, an infrastructure independent representation of a distributed computing application may be deployed and run on various cloud configurations such as on one or more of Amazon EC2, Terremark vCloud, Rackspace Cloudserver, Microsoft Azure, Savvis, or private clusters.

Such an adaptive deployment based on price-performance metrics or other metrics-based criteria may be automated or manual. In some embodiments, automatic deployment based on price-performance and other policy considerations can be achieved through a policy framework. Various exemplary policies may be used to adaptively deploy applications on clouds such as (without limitation) choosing the cloud configuration with: the best price-performance metric, which may be determined though an index such as PPI; the best performance without regard to cost; the lowest total cost cloud configuration to run the application to completion; the cloud configuration with the highest predicted reliability; a custom metric or policy specified by the user.

In general, in some embodiments, system 100 may continuously monitor applications to collect real time information and profile application runtime metrics on virtualized infrastructures. The price-performance information, user and system policies may be used to optimize recommendations regarding a choice of cloud 172 and a configuration within on the configuration.

Figure 2:
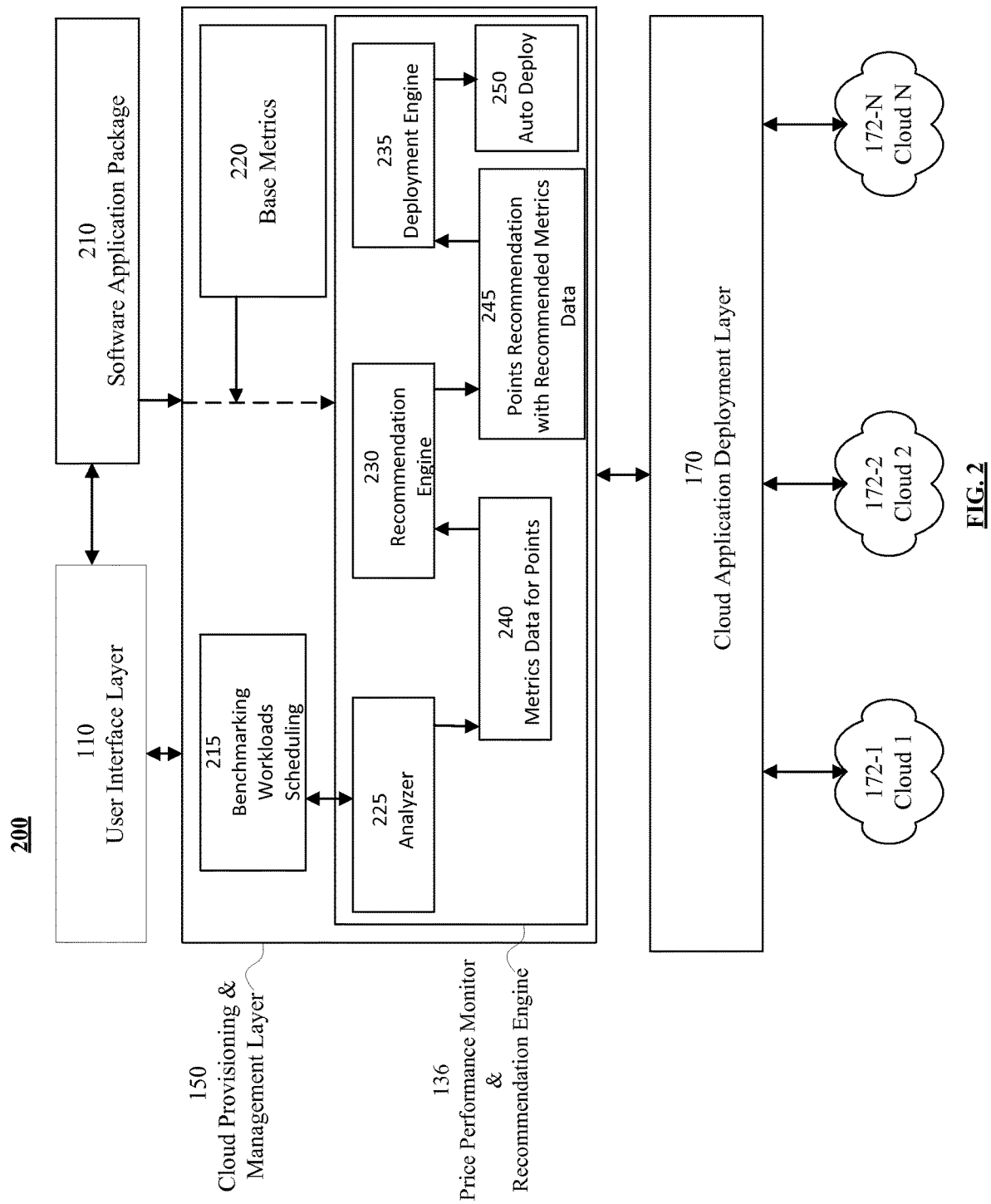
FIG. 2 depicts an exemplary system for deploying applications on clouds showing inputs to and details of Price Performance Monitor and Recommendation Engine.

FIG. 2 depicts an exemplary system 200 for deploying applications on clouds showing inputs to and details of Price Performance Monitor and Recommendation Engine 136. As shown in FIG. 2, Software Application Package 210 may be any program suite imported by the user. For example, a user may import Software Application Package 210 using Application Importer module 112 in User Interface Layer 110. As noted earlier, exemplary Cloud Provisioning and Management Layer 150 may facilitate the monitoring and management of cloud resource usage and prepare applications for deployment on one or more clouds 172. Further, in some implementations the deployment and running of applications and the dynamic management of clusters and other cloud resources may be facilitated by Cloud Application Deployment Layer 170. In FIG. 2, some details of exemplary Cloud Provisioning and Management Layer 150 and Cloud Application Deployment Layer 170 have been omitted for ease of description.

In some implementations, Price Performance Monitor and Recommendation Engine 136 may facilitate the adaptive deployment of Software Application Package 210 on an optimal Cloud 172 from the available universe of Clouds 172-1, 172-2, . . . 172-N, based on one or more parameters, including current and projected cloud pricing, available cloud features, user and system policies, cloud configuration metrics, including application metrics, and historic and projected cloud and application data.

As shown in FIG. 2, Price Performance Monitor and Recommendation Engine 136 may comprise Analyzer 225, Recommendation Engine 230, and Deployment Engine 235. In some embodiments, a user may optionally specify a set of Base Metrics 220 for Software Application Package 210. For example, in one embodiment, the user may specify Base Metrics 220 as a declarative list of metrics along with a value or a range of values corresponding to each listed metric to indicate a set of acceptable runtime metrics for the given application. In addition, the user may rank or otherwise prioritize the list to specify a relative importance of the metrics.

In some embodiments, Price Performance Monitor and Recommendation Engine 136 may use Base Metrics 220 to determine one or more configurations of clouds 172 that meet or are likely to meet criteria specified in Base Metrics 220 when running Software Application Package 210. In some embodiments, Cloud configurations that do not meet (or are nor projected to meet) the criteria set by Base Metrics 220 may be eliminated from consideration as candidates for running Software Application Package 210.

Base Metrics 220 may include latency, throughput (the number of application runs/requests completed in a unit of time), cost, uptime (the percentage of time that an application is available to service requests), and a security metric (some measure capturing the security level of a cloud). In some embodiments, Base Metrics 220 may include derived metrics that may be composed or derived by mathematically combining the pre-defined or system specified metrics in Base Metrics 220. For example, if "throughput per hour" and "cost per application" are predefined metrics in Base Metrics 220, then a derived metric "Cost per hour" may be constructed as Cost per hour=(Throughput per hour)*
(Cost per application)

In some embodiments, a prioritized ordered list or a priority template may be used by Price Performance Monitor and Recommendation Engine 136 to select candidate Clouds 172 for application deployment. For example, an exemplary prioritized list for selecting Clouds 172 to deploy and run Software Application Package 210 may specify:
 1. [latency <1 Hour, cost <$10]
 2. [1 hour <latency <2 hour, cost <$20]
In some embodiments, Price Performance Monitor and Recommendation Engine 136 may use the prioritized list to first check if any infrastructure and configuration (a point) can meet the first specified criterion (latency <1 Hour and cost <$10). If the criterion is met by one or more cloud configurations, then these cloud configurations may be selected as candidates for deploying Software Application Package 210. On the other hand, if the first criterion cannot be met, then the next condition may be checked against available cloud configurations and Price Performance Monitor and Recommendation Engine 136 proceeds down the prioritized list.

In some embodiments, the prioritized template may also be used to directly select a cloud configuration for deploying Software Application Package 210. For example, when evaluating clouds based on the first criterion above (latency <1 Hour, cost <$10), Price Performance Monitor and Recommendation Engine 136 may select the lowest latency cloud configuration from among the candidate cloud configurations because the latency metric occurs textually before the cost metric in the specification of the criterion. Similarly, a prioritized list reciting
 1. PPI>0
will ensure that the selected cloud configuration for deploying Software Application Package 210 has the highest PPI; while the prioritized list showing
 1. Cost <Infinity
will ensure that the selected cloud configuration for deploying Software Application Package 210 has the lowest cost. In general, various other techniques and templates to specify criteria for selecting cloud configuration candidates for application deployment may be used as will be apparent to one of ordinary skill in the art.

In some embodiments, Price Performance Monitor and Recommendation Engine 136 may then deploy Software Application Package 210 on the selected cloud configuration using one or more modules in Cloud Provisioning and Management Layer 150 and/or Cloud Application Deployment Layer 170 using functionality provided by Cloud Standardization Layer 160 (not shown). For example, a library routine, which may form part of Cloud Specific Library 144, may be used for deployment. The exemplary library routine may be invoked as Deploy(Software Application Package app, Infrastructure infra, Configuration config) with appropriate values for parameters app, infra, and config, thereby resulting in the deployment of application app on cloud infra with configuration config. Cloud configuration config may specify available compute, storage and network resources as well as the number or size of such resources. For example, config may specify a cluster of "n" nodes on a cloud infra, where each node may have a certain compute power, memory and attached disk storage. Cloud Specific Libraries 144 may include various other routines such as:
 List( ), which provides a list of all clouds 172 in the universe of supported clouds;
 List(Infrastructure infra), which provides a list of all available configurations infra in clouds 172;
 Measure(Software Application Package app, Data data, Infrastructure infra, Configuration config), which returns a measurement of runtime metrics based on monitoring a run of application app on cloud infra and cloud configuration config.
In general, a cloud—configuration pair (infra, config) may be seen as a data point and metrics may be classified or associated with data points.

In some embodiments, Analyzer 225 may collect data from various benchmarking runs, actual application runs, and system profiling runs and make the benchmarking and actual run data available to users as well as to Recommendation Engine 230. In some embodiments, the benchmarking and actual run data may be stored in a database, sorted, and/or associated with or classified by cloud—configuration, and passed to Recommendation Engine 230 as Metrics Data for Points 240 though an associated API. For example, Analyzer 225 may run and schedule benchmarking workloads using Benchmarking Workloads Scheduling module 215 on one or more available cloud configurations, including cloud configurations specified by users, existing, new or updated configurations, and collect data from the runs for storage using APIs associated with Metrics Data for Points 240, which may then be accessed by Recommendation Engine 230.

In some embodiments, Recommendation Engine 230 may use Metrics Data for Points 240, which may include historical application run data and benchmarking data provided by Analyzer 225, as well as current dynamically obtained real time metrics data pertaining to Clouds, Applications, collected from monitors and other agents to predict application runtime metrics on available choices of points. For example, data collected by, provided to, and/or received by Recommendation Engine 230 may be used by algorithms and an extensible system to predict application runtime metrics for Software Application Package 210 on available cloud—configuration pairs or data points.

Extensibility as used with Recommendation Engine 230 refers to the capability of Recommendation Engine 230 to factor in alternate sources of information other than metrics obtained from Analyzer 225. In some embodiments, these additional metrics may be combined with information in Metrics Data for Points 240, or received/accessed dynamically in real time from other agents monitoring applications, clouds, workloads, and pricing. For example, a pricing agent running on Cloud 172-1 may indicate lower "spot pricing" for some configurations on cloud 172-1 for a current run or for a run during an upcoming period, which may alter PPI numbers associated with those configurations. Similarly, an agent may indicate higher workload at the current time on Cloud 172-2, which may affect PPI numbers associated with Cloud 172-2. In some embodiments, Recommendation Engine 230 may use some combination of dynamic real time data received from agents in combination with historic stored metrics and/or other calculated or derived metrics in arriving at recommendations specified in Points Recommendation with Recommended Metrics Data 245.

In some embodiments, Recommendation Engine 230 may additionally use criteria specified in Base Metrics 220 to match user and/or system specified criteria in making recommendations on cloud configurations to run Software Application Package 210. In some embodiments, Recommendation Engine 230 may store and/or make recommendation data available through Points Recommendation with Recommended Metrics Data 245, either directly or through associated APIs to Deployment Engine 235.

In some embodiments, the cloud configurations in Points Recommendation with Recommended Metrics Data 245 for running Software Application Package 210 may also be provided or made available to the end-user by one or more modules on User Interface Layer 110 such as Price Performance Recommendations/Settings module 114. In some embodiments, recommendations may be provided to users and Deployment Engine 235 on a periodic basis or based on event triggers such as new incoming metrics data including dynamically obtained real time metrics data, and/or the availability of new cloud configurations.

In some embodiments, Deployment Engine 235 may help prepare applications for deployment/redeployment on one or more clouds 172 based on the latest optimality predictions in Points Recommendation with Recommended Metrics Data 245, which may received from Recommendation Engine 230, or accessed by Deployment Engine 235. In some embodiments, Deployment Engine 235 may prepare the application for deployment/redeployment if the user, application, or system parameters specify "auto deploy." Automatic deployment, which may be implemented by Auto Deploy module 250, may facilitate the deployment/redeployment of applications on an optimal recommended cloud configuration, which, in some instances, may be a predicted optimal cloud configuration that meets other user and/or system specified criteria.

In some embodiments, Deployment Engine 235 may configure applications for deployment/redeployment using Auto Deploy module 250 either on a periodic basis, and/or based on an event trigger such as new incoming recommendation data. For example, Auto Deploy module 250 may interact with Cloud Standardization Layer 160 (not shown) to provide new cloud configuration data for Software Application Package 210 to permit deployment of Software Application Package 210 on a new configuration on the selected Cloud 172. Deployment of Software Application Package 210 may be accomplished, for example, as described earlier, by Cloud Application Deployment Layer 170.

In instances, where the user/system has not enabled auto-deployment, then a user may be notified of the option to redeploy to a better configuration. For example, the notification may be made through a pop-up window in User Interface Layer 110 when a user logs in, or via email, a text message, Instant Messaging (IM), Short Messaging Service (SMS), or other electronic means. In some embodiments, Deployment Engine 235 may also traverse cloud configuration recommendations from Recommendation Engine 230 in order of priority, and adaptively deploy Software Application Package 210 on a highest priority optimal point.

Figure 3:
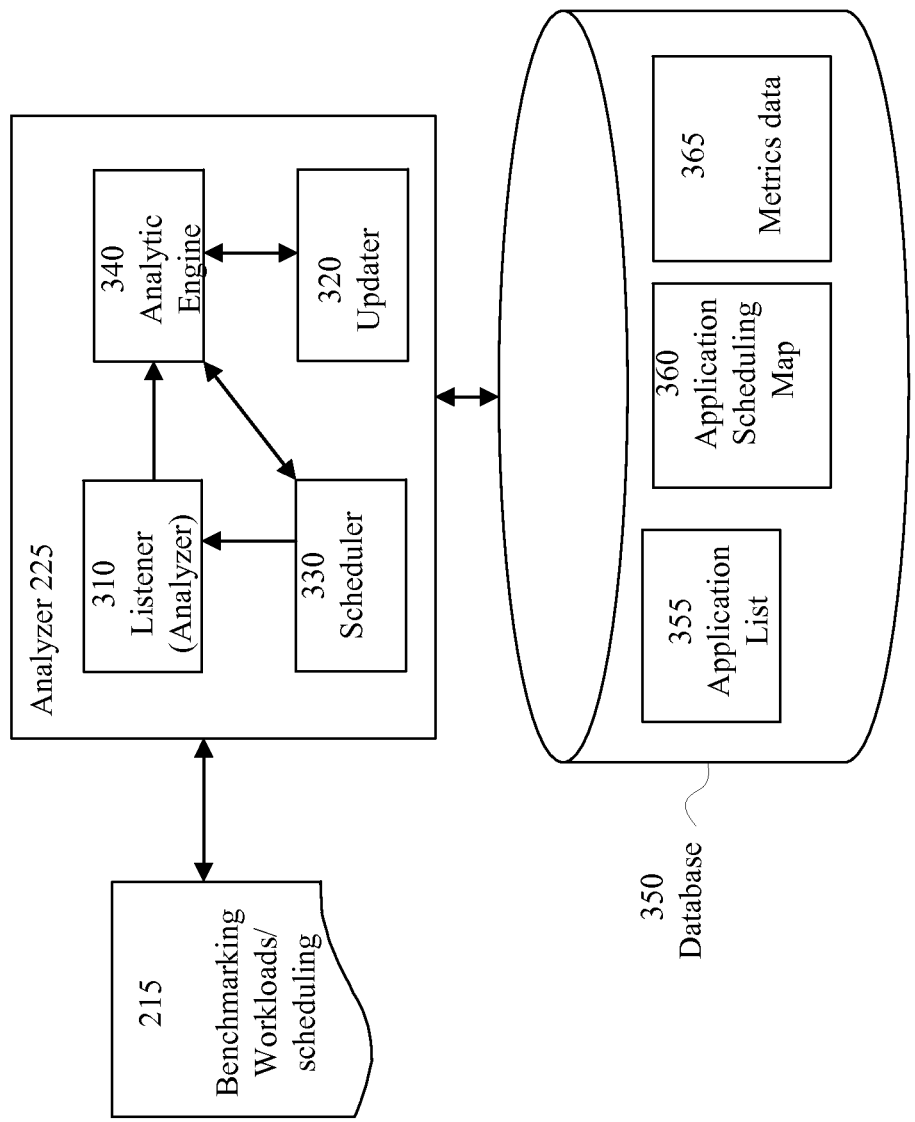
FIG. 3 shows an exemplary block diagram illustrating components of Analyzer and other modules associated with Analyzer.

FIG. 3 shows an exemplary block diagram illustrating components of Analyzer 225 and other modules associated with Analyzer 225. It should be noted that the block diagram shown is exemplary and for descriptive purposes only and modules shown in FIG. 3 may be separated from or integrated into Analyzer 225 in a manner consistent with disclosed embodiments and without detracting from the functionality of the system. Further, in some embodiments, one or more modules shown in FIG. 3 may be shared with other components and modules of Price Performance Monitor and Recommendation Engine 136. For example, in one embodiment, Database 350 may be shared by Analyzer 225, Recommendation Engine 230, and Deployment Engine 235.

Similarly, in some embodiments, Listener 310 may be a single process serving many modules in Price Performance Monitor and Recommendation Engine 136 and capable of routing event notifications to the appropriate module. The terms in parentheses serve merely to remove contextual ambiguities when the terms "Listener" and "Notifier" are used in the description.

As shown in FIG. 3, Analyzer 225 may comprise Listener (Analyzer) 310, Updater 320, Scheduler 330, and Engine 340 and may interact and exchange information with Benchmarking Workloads/Scheduling module 215 and Database 350.

Exemplary Database 350 may take the form of a standard Relational Database Management System (RDBMS). In some embodiments, Database 350 may be used to hold, maintain and update tables, metrics, and various data used by Analyzer 225. In some embodiments, Database 350 may hold information including but not limited to: Application List 355 comprising applications, which may each be identified with a unique identifier; compiled Metrics Data 365, which may include various cloud configuration metrics including a history of application runs and metrics data for each run of an application or benchmark on a cloud configuration; and Application Scheduling Map 360 comprising a schedule for test runs of one or more applications.

In some embodiments, Updater 320 may interact with Database 350 to update information therein. For example, if a new schedule for test runs of Software Application Package 210 is specified by a user, the test run schedule in Database 350 for Software Application Package 210 may be updated by Updater 320. In some embodiments, Updater 320 may also update Database 350 with new metrics data whenever such data is available from completed application runs, or from data supplied by Benchmarking Workloads/Scheduling module 215.

In some embodiments, Scheduler 330 may monitor the schedule of test runs in Database 350 and launch one or more new test runs based on the test schedule. If a new test run is to be launched, Scheduler 330 may generate an event to notify Listener (Analyzer) 310 with information pertaining to the new test run to be launched for an application such as Software Application Package 210.

In some embodiments, Listener (Analyzer) 310 may listen to two kinds of events: events notified by Scheduler 330 pertaining to the launching of new test runs; and notifications from other modules in Cloud Provisioning and Management Layer 150 pertaining to completed application runs. In some embodiments, Listener (Analyzer) 310 may use notifications from Cloud Provisioning and Management Layer 150 to inform Updater 320 to update Database 350 with new metrics information from completed runs.

In some embodiments, well-known publish-subscribe or pub-sub models for event monitoring and notification may be used. For example, senders of event notifications (termed publishers) may publish the event notifications and receivers of event notifications (termed subscribers) may subscribe to one or more events or event classes and receive messages that are of interest. Thus, senders and receivers are effectively decoupled and various modules may send and receive event notifications. In addition, as additional data is collected and reported by agents deployed in the system, modules may selectively subscribe to events that are of interest allowing for improved scalability, customization and maintenance. Accordingly, in some embodiments, system 100 may employ pub-sub techniques for the communication of event notifications.

In some embodiments, Analytics Engine 340 may help coordinate the operations of Updater 320, Scheduler 330 and Listener (Analyzer) 310 and manage the data in Database 350. For example, Analytics Engine 340 may sort and perform other analytic operations on the benchmarking and actual run data stored in Database 350 database, and pass the stored information to Recommendation Engine 230 as Metrics Data for Points 240 though an associated API. In some embodiments, Analytics Engine 340 may also start one or more application benchmarking runs using Benchmarking Workloads/Scheduling module 215. For example, Analytics Engine 340 may start a new or scheduled benchmarking run on some portion of the universe of available cloud—configuration "points" when it receives an appropriate event notification from Listener 310.

Figure 4A:
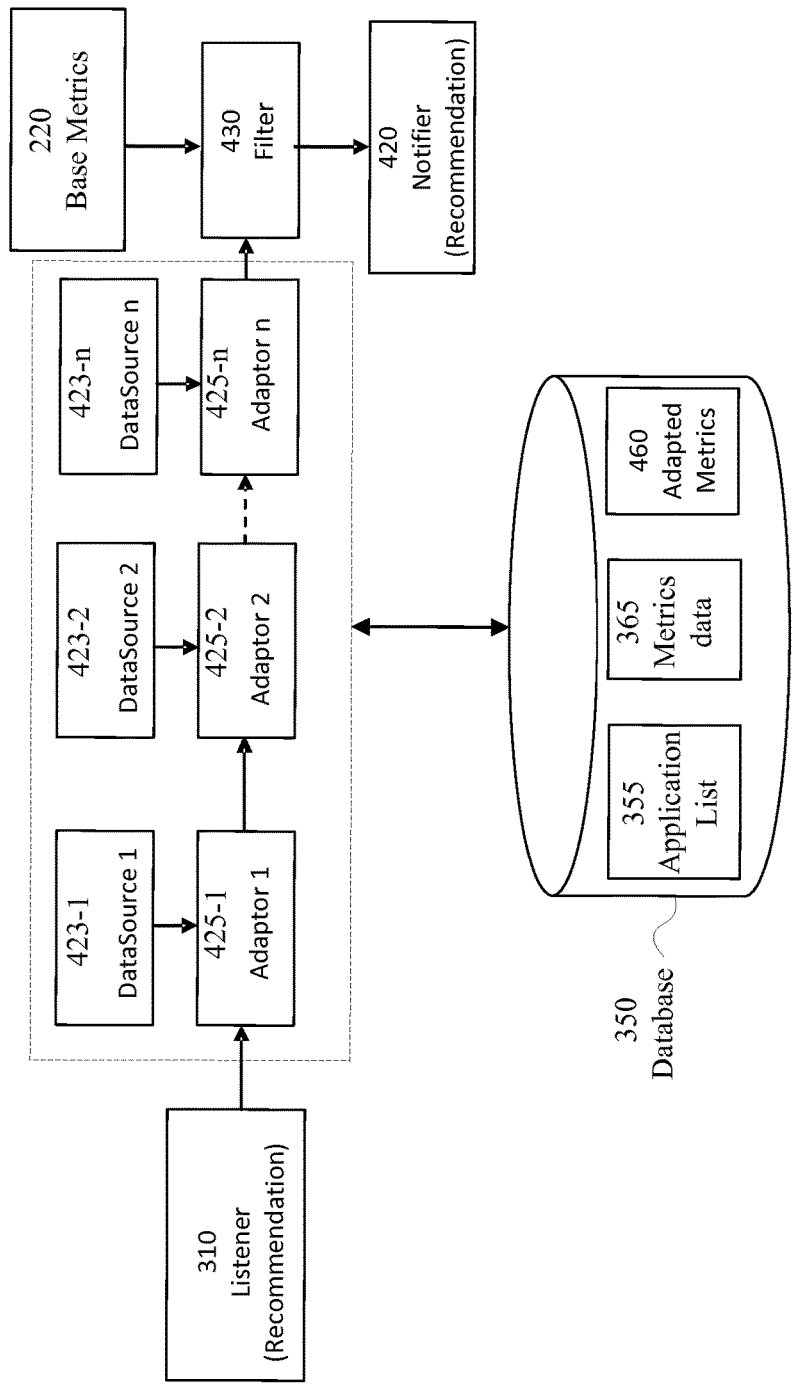
FIG. 4A shows an exemplary block diagram illustrating components of exemplary Recommendation Engine and other modules associated with Recommendation Engine.

FIG. 4A shows an exemplary block diagram 400 illustrating components of exemplary Recommendation Engine 230 and other modules associated with Recommendation Engine 230. As shown in FIG. 4, Recommendation Engine 230 may comprise Listener (Recommendation) 310, DataSources 423, Adaptors 425, Filter 430 and Notifier (Recommendation) 420.

It should be noted that the block diagram shown is exemplary and for descriptive purposes only and modules shown in FIG. 4 may be separated from or integrated into Recommendation Engine 230 in a manner consistent with disclosed embodiments and without detracting from the functionality of the system. Further, in some embodiments, one or more modules shown in FIG. 4 may be shared with other components and modules of Price Performance Monitor and Recommendation Engine 136. For example, in one embodiment, Notifier (Recommendation) 420 may also be a single process serving multiple modules in Price Performance Monitor and Recommendation Engine 136.

In some embodiments, Database 350 may include information pertaining to: Application List 355 comprising applications, which may each be identified with a unique identifier; and Adapted Metrics 460 for each application. Further, in some embodiments, Listener (Recommendation) 310 may monitor various event notifications including those pertaining to scheduled events and/or events that may change or lead to changes in metrics data. In some embodiments, Listener (Recommendation) 310 may begin the sequence of steps constituting a new recommendation process.

In some implementations, recommendation runs may be viewed as a result of utilizing a series of Adaptors 425-$i$ (such as Adaptors 425-1, 425-2, . . . 425 $n$) with an adaptor algorithm to update metrics data based on corresponding DataSources 423-$i$ (such as DataSources 423-1, 423-2, . . . 423-$n$) in order to better estimate likely application runtime metrics.

As shown in FIG. 4A, the sequence of Adaptors 425-1, 425-2 . . . 425-$n$, depicts some subset of available Adaptors 425 in an ordering that may be specific to a user, system, and application run. Accordingly, a different subset and/or ordering of Adaptors 425 may be specified: (i) for another run of same application by the user; (ii) for a different application or set of applications; (iii) by a different user. In general, the subset and ordering of Adaptors 425 for an application run at a given time may be dynamically determined based on prevalent user and/or system settings at that time. In some embodiments, the sequence of Adaptors may be set as part of a "user profile" so that all applications run by the user use the same sequence of Adaptors 425. Various other possibilities consistent with disclosures herein are envisaged and will be apparent to one of ordinary skill in the art.

In some embodiments, Recommendation Engine 230 may be configured to have a plurality of Adaptors 425 selected from available adaptors that may be utilized in some specified sequence. In some embodiments, the set of Adaptors and their sequence may be set explicitly by the user and/or may be determined automatically, in part, based on policies set in Policy Settings 116, Price Performance/Recommendation Settings 114, and/or other default system defined parameters. In some embodiments, additional Adaptors 425 may be added to Recommendation Engine 230 at any time.

In one embodiment, Adaptors 425 may use Metrics Data 365 as an input and optionally a data source, such as one of corresponding exemplary DataSources 423. In some embodiments, a method, such as a statistical or predictive analysis algorithm or some portion thereof, which is associated with an Adaptor 425-$i$ may be used to modify Metrics Data 365 to obtain Adapted Metrics data 460. Adapted Metrics data 460 may then be passed on to and/or retrieved by a subsequent adaptor such as Adaptor 425-$j$ ($j=i+1$) as may be specified in a user and/or system defined ordering. A method associated with Adaptor 425-*j* may then operate on Adapted Metrics data 460 received from Adaptor 425-*i* further modifying the metrics to obtain updated Adapted Metrics data 460. In some embodiments, after each modification by an individual Adaptor 425, Adapted Metrics data 460 may be stored and/or updated in database 350 to ensure data persistence between Adaptors 425. In some embodiments, Adapted Metrics data 460 may be stored and/or updated after modification by Adaptor 425-*i* and prior to use of the modified data by subsequent Adaptor 425-*j*.

For example, a first adaptor such as a Price Profile adaptor may provide updated cloud pricing for clouds 172, including spot and reserved pricing. The data source for the updated pricing may be agents and/or APIs used to query cloud providers, and/or a database with dynamically updated real time cloud pricing information. In one embodiment, the dynamically obtained real time cloud pricing may be used by an algorithm associated with Price Profile adaptor to update Metrics Data 365 with new cloud pricing information in Adapted Metrics 460, which may be passed to a second adaptor and/or stored in database 350.

In some embodiments, the dynamically obtained real time pricing information may replace existing pricing information in Adapted Metrics 460. In some embodiments, existing PPI numbers may be recalculated/updated based on the dynamically obtained real time pricing information. In some embodiments, dynamically obtained real time pricing information may be used instead of using historical pricing information when updating/recalculating metrics.

In the example above, an algorithm associated with the second adaptor may revise cloud price related metrics in Adapted Metrics 460 to obtain first updated Adapted Metrics 460 that reflect the new cloud pricing information. In this example, the second adaptor may not use a data source.

Further, a third adaptor may take the form of a Cloud Workload profiler, which may profile the current or predicted workload on clouds. Cloud Workload profile adaptor may use agents to obtain current workload data in combination with historical chronological data in Metrics data 365 as a data source to make predictions. The historical chronological data may comprise typical cloud workloads for each day of the week, by time of day, by month, etc. and may also include data for various public holidays. Cloud Workload may use the estimated cloud workload to assign a probability that an estimated PPI number will actually be attained. For example, if the cloud workload for a specific cloud "A" is estimated at 20% or 0.2, then Cloud Workload profiler may assign a PPI probability for cloud A as, $$\text{PPI probability} = (1 - \text{estimated cloud } A \text{ workload}) = (1 - 0.2) = 0.8.$$

Cloud Workload profiler adaptor may then update data for clouds with their respective individual calculated PPI probabilities to obtain second updated Adapted Metrics data 460.

Next, a fourth adaptor, which may take the form of a PPI normalizer, may normalize PPI numbers in second updated Adapted Metrics data 460 by multiplying PPI probability with the prior PPI number to obtain a normalized PPI, which may be used to obtain third updated Adapted Metrics Data 460. In this example, the fourth adaptor does not use a data source.

Finally, in the example above, Filter 430 may operate on the normalized PPI data in third updated Adapted Metrics data 460, for example, by using a priority list or priority template in Base Metrics 220 to make recommendations, which may be sent to Notifier (Recommendation) 420.

Examples of statistical parameters and techniques may that be used for making recommendations based on available data may include the calculation and maintenance of averages and correlation coefficients of metrics data such as price performance by application, time of the day, time of the week and cloud provider. Various other parameters such as medians, modes, etc and techniques such as statistical regression analysis may also be provided and used, or specified by users. Therefore adaptors may for example, depending on the application and the time of the day, adjust metrics for different clouds. A confidence level setting may be used for selecting statistical data with a high degree of accuracy.

Once specified Adaptors 125 have operated on Adapted Metrics data 460, Filter 430 may be used. Filter 430 may apply Base Metrics 220 to determine one or more configurations of clouds 172 that meet or are likely to meet criteria specified in Base Metrics 220 when running appropriate Software Application Package(s) 210. In some embodiments, Cloud configurations that do not meet (or are nor projected to meet) the criteria set by Base Metrics 220 may be eliminated from consideration as candidates for running Software Application Package 210. In some embodiments, Filter 430, which may be viewed as the final adaptor in an adaptor sequence, may take a prioritized list or prioritized template as its data source and qualify points for recommendations based on the final adapted metrics and Base Metrics 220. In some embodiments, the output of Filter 430, which may include recommendations of cloud-configuration points, may be provided to Notifier 420.

In some embodiments, Notifier 420 may interface with several notification modules and processing engines. For example, Notifier 420 may interface with one or more of an E-mail module, IM module, and/or an SMS module to send updates to users. In addition, in some instances, Notifier 420 may alert modules associated with the automatic deployment such as Auto Deploy module 250. If auto-deployment of Software Application Package 210 has been specified, then, upon receiving a notification from Notifier 420, Auto Deploy module 250 may facilitate the deployment/redeployment of applications based on the latest recommended cloud configuration. In some embodiments, if the latest recommended cloud-configuration for Software Application Package 210 is not available, then Auto Deploy module 250 may use the next best cloud-configuration.

Various types of exemplary Adaptors 425 may be used by Recommendation Engine 230. For example, a Cross Customer Analytics Adapter may gather and store metrics data from application runs performed by different users and/or customers and correlates the data with those of similar application runs from other users. In some embodiments, application profile data or other information obtained using system 100 may be utilized to determine similarity of applications. In some embodiments, the aggregate metrics data may be stored separately from individual user metrics data. Further, in some embodiments, aggregate metrics data may be used along with application profiles to predict price-performance for an application, when cloud-configuration recommendations are made to new customers/users.

As another adaptor example, a Normalizer adaptor may add a new metric that normalizes data from different application runs by transforming price and/or performance metrics to a single uniform index, such as the price-performance index (PPI) discussed above. By normalizing price-performance information to a single uniform number or index, metrics from very different application runs may be used to take advantage of a better prediction.

As a further example, a Price Profiler use current pricing data to modify benchmarks and other cost-based performance metrics. In some embodiments, a Data Source for this adaptor may be an agent running on one or more clouds that provides the latest price data, including spot and reserved pricing, from cloud providers. In some embodiments, the latest cost data may be obtained directly from cloud providers by using appropriate APIs.

As another example, a Standard Profiler adaptor may continuously monitor performance and reliability on clouds. For example, Standard Profiler may be used to normalize user application performance by using a standard benchmarking application running on each cloud. Standard Profiler may also be used to detect infrastructure downtime. The Data Source for exemplary Standard Profile adaptor may be a standard profiling application that continuously monitors performance of the benchmarking application as well as the reliability of the clouds running the benchmarking application. User applications can be normalized for performance against such a standard benchmarking application. Standard Profiler may be used to update performance metrics in real-time based on the performance reported by the standard profiling application.

Another exemplary adaptor may take the form of a Time of the Day Heuristics adaptor, which may correlate historical data such as time of day and day of week information from application or benchmark runs with performance. If application/benchmark runs during specific time periods exhibit relatively consistent and significant variance relative to application performance during other periods, then Time of the Day Heuristics adaptor may be used to favor those time periods that exhibit better performance and disfavor those that have lower performance.

Figure 4B:
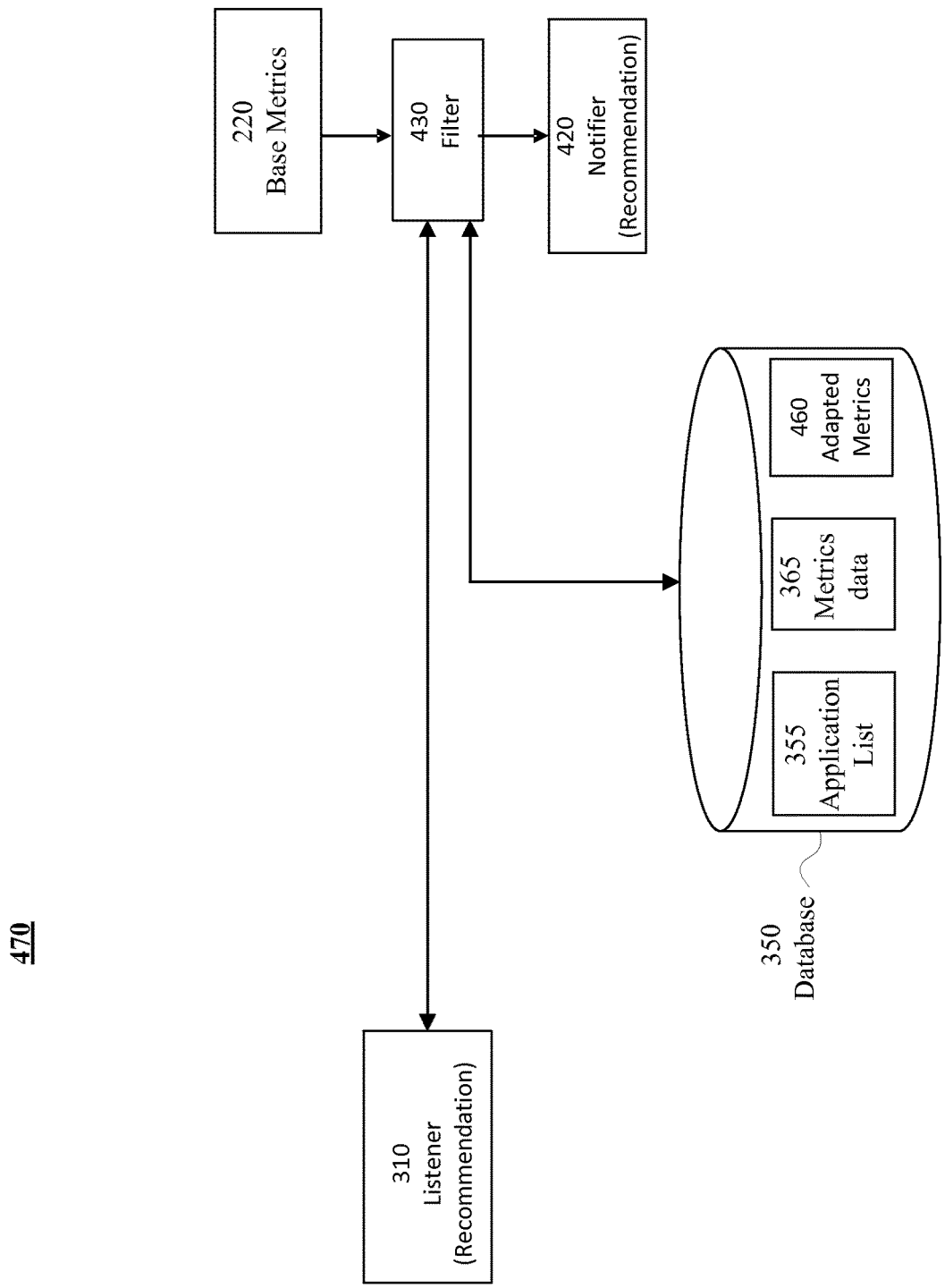
FIG. 4B depicts a system showing a configuration of Recommendation Engine without Adaptors.

FIG. 4B depicts a system 470 showing a configuration of Recommendation Engine 230 without Adaptors 425. In one embodiment, as shown in FIG. 4A, Recommendation Engine 230 may be configured without Adaptors 425 and may use Filter 430 to process Metrics Data 365 and generate recommendations for Notifier 420.

Figure 4C:
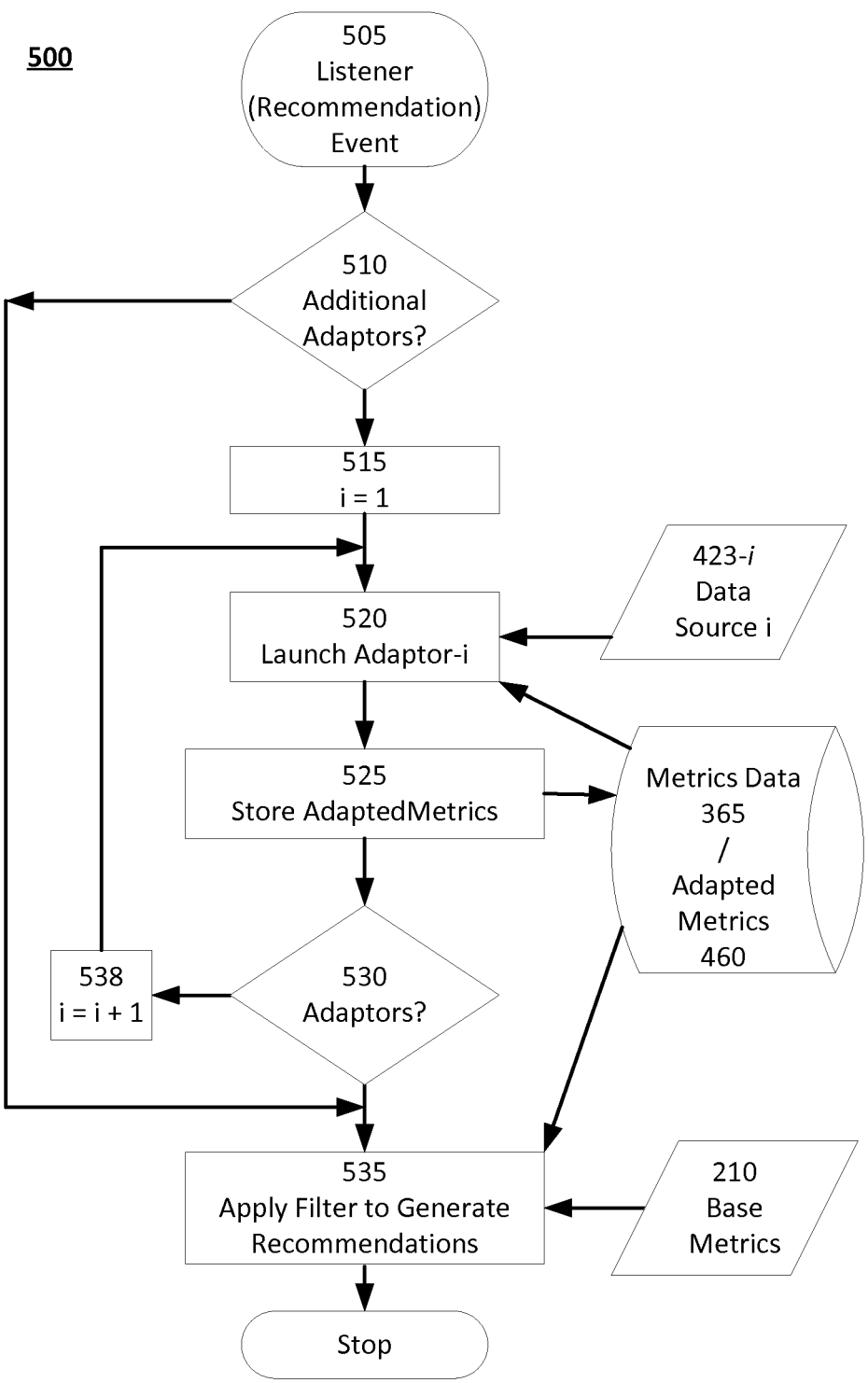
FIG. 4C shows a flowchart illustrating an exemplary method for making cloud configuration recommendations in a manner consistent with disclosed embodiments.

FIG. 4C shows a flowchart illustrating an exemplary method 500 for making cloud configuration recommendations in a manner consistent with disclosed embodiments. In some embodiments, method 500 may be performed by a processor implementing Recommendation Engine 230.

In step 505, Listener (Recommendation) 310 may be alerted to an event notification such as a notification pertaining to a scheduled or user-launched event such as an application run, and/or an event that may change or lead to changes in metrics data. In some embodiments, in step 510, the method may determine if there are any adaptors, such as Adaptors 425 related to the event.

If there are adaptors ("Y", in step 510), such as Adaptors 425, then, in step 515, a counter i may be initialized to 1, and the Adaptor-i, such as Adaptor-1 425-1 for i=1, may be launched in step 520. If there are no adaptors ("N", in step 510), then, the algorithm proceeds to step 535.

In step 520, Adaptor-i may receive or retrieve metrics from DataSource-i 423-i, such as DataSource-1 423-1, for i=1 and from Metrics Data 365. Further, in some embodiments, Adaptor-i may perform modifications on Metrics Data 365 to obtain Adapted Metrics 460. In step 525, Adapted Metrics 460 may be stored. In some embodiments, Adapted Metrics 460 may be stored in database 350.

In step 530, the algorithm checks if there are any further adaptors. If there are additional adaptors ("Y", in step 530) then the algorithm increments counter i by setting i=i+1, in step 538, and returns to step 520 to begin another iteration with the next adaptor. If there are no adaptors ("N", in step 530), then the algorithm proceeds to step 535.

In step 535, a filter, such as exemplary Filter 430, may be applied to the Metrics Data 365 (if there were no adapters) or to the updated Adapted Metrics data 460 as modified by the final adapter in the sequence using Basic Metrics 210 as input. For example, Basic Metrics 210 data may be an ordered list where each element may take the forms:

(M, Comparator, V), or (M, Comparator, V, (logical operator, M, Comparator, Value)* where M specifies the name of a metric, Comparator may be a comparison operator (such as $<, >, =, \neq, \geq$, floor, ceiling, etc) that compares the value of M to the value of V; and (logical operator, M, Comparator, V)* indicates that the term inside parentheses may occur zero or more times. The comparator can be mathematical function such as greater than, less than, etc. or, in some embodiments, an interface implementation of the Comparator interface in the Java Programming Language as an example. A set of recommendations may be generated in step 535 as a consequence of applying the filter in step 535. In some embodiments, the Recommendations, and optionally the adapted metrics associated with each recommendation may be sent to Notifier (Recommendation) 420.

In some embodiments, an exemplary Filter may be implemented based on the following exemplary pseudo-code. The code below takes input adapted metrics 460 and filters out all metrics that do not satisfy the base metrics 220. The output set is a list of recommendation points—cloud configurations—on which the application may be deployed so that it satisfies the desired base metrics. In some embodiments, the output set may be ordered to reflect a priority order. For example, the output set may present recommendation points in decreasing order of priority—so that the first point is the most recommended and last point is the least recommended. In the description following the pseudo code below, variable names in the pseudo code have been placed in parentheses in some instances for clarity.

```
10  START
20      Input_Metrics = Input_Adapted_Metrics
30      Recommended_Points = new List( );
40      For each Base_Metric base in Base_Metrics
50          For each Input_Metric input in Input_Metrics
60              Boolean satisfied = compare(input, base)
70              If (satisfied) {Recommended_Points.add(input)}
80          End For Loop
90          // break from outer loop if no more recommended points
100         If (! Recommended_Points.empty( )) GOTO 120
110     End For Loop
120     Output Metrics = Recommended Points;
130 END
```

In line 20, the code initializes a list of input metrics (input_metrics) to adapted metrics 460 (Input_Adapted_Metrics) received from last adaptor 420-n. An empty list of recommendation points (Recommended_Points) is created in line 30. In some embodiments, the list of recommendation points may be an ordered list populated with the cloud configurations that meet criteria specified in the base metrics 220.

The code then iterates over the base metrics 220 (Base_Metrics) in line 40. Since base metrics 220 (Base_Metrics) may take the form of an ordered list, the highest priority metric (base) in base metrics (Base_Metrics) may be selected first.

Next, for each base metric (base) in base metrics (Base_Metrics), an inner loop iterates over each input metric (input) in the input metrics (Input_Adapted_Metrics) in line 50. In line 60, each input metric (input) is compared to check if the cloud-configuration associated with the input metric data (input) meets the criteria specified by base metrics (base).

In some embodiments, the code in line 60 may be implemented using a compare routine (Compare) with input metric (input) and base metric (base) as inputs. In some embodiments, the compare routine of line 60 may be implemented as follows

```
200    Boolean Compare (input, base) {
210        Return (input(base.M) base. Comparator base.V);
220    }
```

The compare routine (Compare) in line 200 may evaluate whether the specific input parameter corresponding to the specified base metric M satisfies a specified base metric value V (base.V) using the base metric comparator. For example, if the base metrics specify [latency <2 hour], then the "latency" metric in input parameter (input) would be selected, i.e. in the compare routine (Compare) code below, input(base.M) would select the "latency" metric in the input parameter (input) to the compare routine and compare the input latency of the associated cloud-configuration to determine if it was less than 2 hours. In the example above, the comparator (base.Comparator) would be "<" and base.V would be 2 hours.

In line 210, if the result of the comparison is returned as "True" (e.g. 1) or "False" (e.g. 0). In line 70, if the input metric has met the specified base metric criteria, then the cloud configuration associated with the input metric may be added to the list of recommended points. In line 100, if, after comparing each input metric with criteria specified by base metric (base), the list of recommended points is still empty, then the comparison returns to line 40 to continue iterating with the next base metric (base) in line 40. Otherwise (if there are recommended cloud-configurations) then the code jumps to step 110 and returns the highest priority recommendations.

Figure 4D:
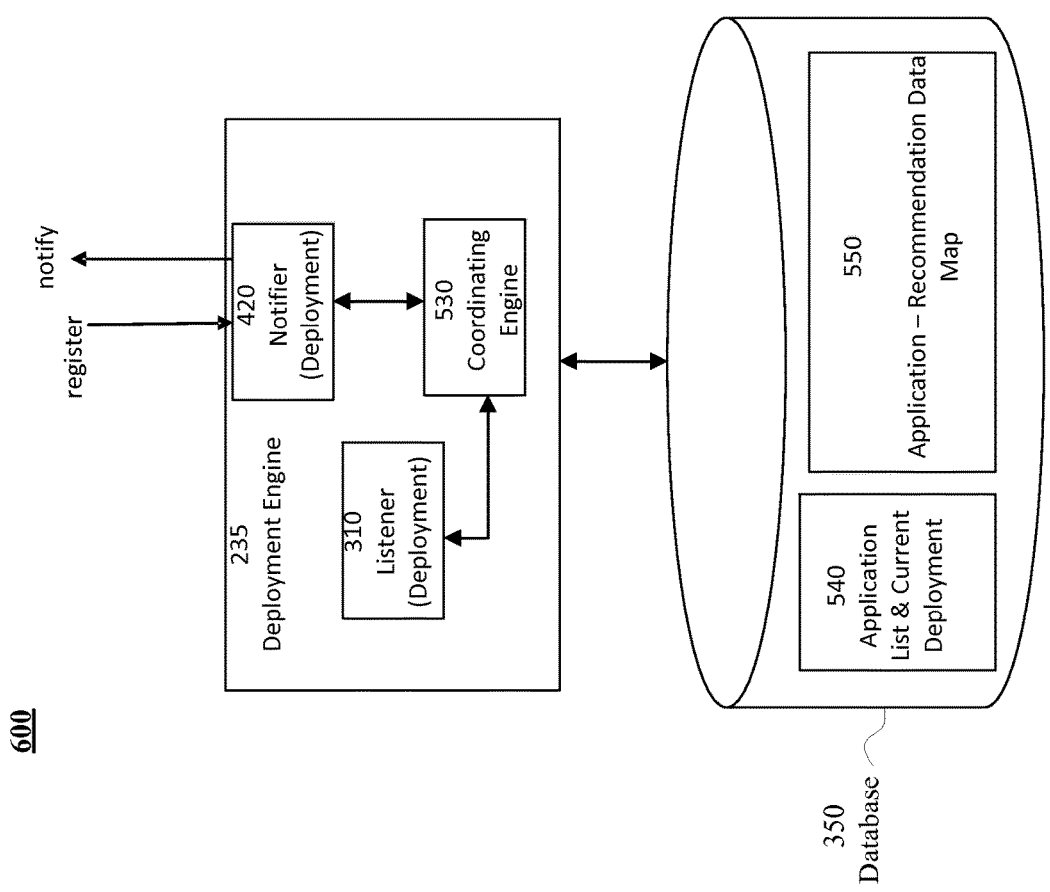
FIG. 4D shows an exemplary block diagram illustrating components exemplary Deployment Engine and other modules associated with Deployment Engine.

FIG. 4D shows an exemplary block diagram 600 illustrating components exemplary Deployment Engine 235 and other modules associated with Deployment Engine 235. As shown in FIG. 4D, Deployment Engine 235 may comprise Listener (Deployment) 510, Notifier 420, and Coordinating Engine 530. It should be noted that the block diagram shown is exemplary and for descriptive purposes only and modules shown in FIG. 4 may be separated from or integrated into Deployment Engine 235 in a manner consistent with disclosed embodiments and without detracting from the functionality of the system. Further one or more modules may be shared with other components of Price Performance Monitor and Recommendation Engine 136. For example, in one embodiment, Database 350 may be shared with Analyzer 225. Similarly, in some embodiments, Listener (Deployment) 510 may be a single process serving many modules in Price Performance Monitor and Recommendation Engine 136 and capable of routing event notifications to the appropriate module. The parentheses are being used to merely to remove contextual ambiguities when the terms "Listener" and "Notifier" are used in the description.

In some embodiments, Database 350 may include information pertaining to: Application List and Current Deployment 540, which includes applications recognized by the system and information on where they are currently deployed 540; and Application—Recommendation Data Map 550, which includes a list of recent cloud-configuration recommendations for each application and a timestamp indicating the last time the cloud—configuration recommendations were updated.

In some embodiments, Listener (Deployment) 510 may receive event notifications when a cloud-configuration recommendation for an application such as Software Application Package 210 is made. In some embodiments, Listener (Deployment) 510 may notify Coordinating Engine 530 about the received cloud-configuration recommendation associated with Software Application Package 210.

In some embodiments, Coordinating Engine 530 may then query Database 350 to determine if the latest cloud-configuration recommendation for Software Application Package 210 is different from the stored cloud-configuration recommendation associated with Software Application Package 210 in Database 350. If the latest cloud-configuration recommendation for Software Application Package 210 is different from the recommendation in Database 350 then Coordinating Engine 530 may alert Notifier 420.

In some embodiments, Notifier 420 may interface with several notification modules and processing engines. For example, Notifier 420 may interface with one or more of an E-mail module, IM module, and/or an SMS module to send updates to users. In addition, in some instances, Notifier 420 may alert modules associated with the automatic deployment such as Auto Deploy module 250. If auto-deployment of Software Application Package 210 has been specified, then, upon receiving a notification from Notifier 420, Auto Deploy module 250 may facilitate the deployment/redeployment of applications based on the latest recommended cloud configuration. In some embodiments, if the latest recommended cloud-configuration for Software Application Package 210 is not available, then Auto Deploy module 250 may use the next best cloud-configuration.

Note that although the description above uses exemplary cloud infrastructures to describe possible implementations, alternate implementations are envisaged and the methods described could be extended to other cloud infrastructures as would be apparent to one of ordinary skill in the art. Further, although primitives, composite interfaces, and templates have been described as exemplary intermediate infrastructure independent representations, other infrastructure independent intermediate representational schemes may also be used. In some embodiments, software to facilitate conducting the processes described above can be recorded on computer-readable media or computer-readable memory. These include, but are not limited to, hard drives, solid state drives, optical media, removable media, and the like.

In some embodiments, the methods described herein may be implemented using a variety of wired and/or wirelessly networked processors, various computers, and computing devices, including mobile devices such as smartphones, notebooks, and handheld computers, and various distributed computing systems.

Other embodiments of the present invention will be apparent to those skilled in the art from consideration of the specification and practice of one or more embodiments of the invention disclosed herein. It is intended that the specification and examples be considered as exemplary only, with a true scope and spirit of the invention being indicated by the following claims.

What is claimed is:

1. A method, comprising:
   at a device including a processor and a non-transitory memory:

obtaining real-time metrics information from a plurality of sets of cloud configurations of a corresponding plurality of cloud computing systems concurrently running a respective plurality of applications, wherein the real-time metrics information comprises real time pricing information and performance information for the plurality of sets of cloud configurations associated with the plurality of applications concurrently running;

determining at least one adaptor for a particular one of the plurality of applications, wherein a priority of the at least one adaptor is specific to the particular application and determined based on prevalent settings of the cloud computing systems, wherein the at least one adaptor is part of a configurable sequence of adaptors that are each configured to receive, retrieve, or modify metrics, the configurable sequence of adaptors including at least a price adaptor that provides prices for cloud configurations and a workload adaptor that determines workloads of the cloud configurations, wherein the price adaptor obtains updated pricing for the cloud configurations by querying cloud providers or a database with dynamically updated real time cloud pricing information;

modifying the real-time metrics information to obtain adapted metrics by applying the at least one adaptor to the real-time metrics information, including obtaining a subset of the real-time metrics information pertinent to an adaptor of the at least one adaptor, and applying a function associated with the adaptor to the subset of the real-time metrics information to obtain the adapted metrics, wherein the adapted metrics include latency information pertaining to the particular application on the at least one selected cloud configuration and a price-performance metric for the at least one selected cloud configuration is a Price-Performance index (PPI) calculated as an inverse of a combined latency and cost, where a cost for the at least one selected cloud configuration is based on at least one of the real-time metrics information, or the adapted metrics for the at least one selected cloud configuration;

comparing the adapted metrics with base metrics for the particular application, wherein the base metrics indicate a set of prioritized acceptable runtime metrics for the particular application;

selecting, based on the comparison, the at least one cloud configuration from the adapted metrics, the selection being made by filtering out metrics in the adapted metrics that do not satisfy the base metrics; and executing, in response to the selection, computer-readable instructions corresponding to at least one cloud-specific implementation of a cloud-infrastructure independent representation of the particular application within the at least one selected cloud configuration, the cloud infrastructure independent representation being independent across the plurality of cloud computing systems.

2. The method of claim 1, wherein the at least one cloud-specific implementation of the distributed computing application corresponds to the at least one selected cloud configuration.

3. The method of claim 1, wherein the real-time metrics information comprises cross-user metrics information, the cross-user metrics information being based on application profiles and application runs by a plurality of users on the plurality of sets of cloud configurations.

4. The method of claim 1, wherein the adapted metrics are used in a calculation of a price-performance metric for the at least one selected cloud configuration.

5. The method of claim 1, wherein the PPI is calculated as $$PPI = \frac{1}{\text{latency} * \text{cost}}.$$

6. The method of claim 1, wherein the base metrics comprise a maximum latency for running the distributed computing application and the method further comprises:
updating, for each of the plurality of sets of cloud configurations, latency information pertaining to the particular application on the at least one selected cloud configuration, based in part, on a current workload of the at least one selected cloud configuration included in the real-time metrics information.

7. The method of claim 5, wherein the PPI for the at least one selected cloud configuration is normalized based on a size of a data set being processed by the particular application.

8. The method of claim 1, further comprising:
updating the adapted metrics for a subset of the plurality of sets of cloud configurations based, in part, on the real-time metrics information associated with the subset.

9. The method of claim 1, wherein selecting the at least one cloud configuration comprises:
determining, based on a user response to a recommendation of cloud configurations, the at least one cloud configuration.

10. The method of claim 1, wherein the plurality of sets of cloud configurations includes configurations on one or more of public or private clusters.

11. A system, comprising:
a processor, and
a memory operationally coupled to the processor, wherein the memory comprises compiled metrics information for a plurality of sets of cloud configurations, and, wherein, the processor is configured to:
obtain real-time metrics information from the plurality of sets of cloud configurations of a corresponding plurality of cloud computing systems concurrently running a respective plurality of applications, wherein the real-time metrics information comprises real time pricing information and performance information for the plurality of sets of cloud configurations associated with the plurality of applications concurrently running;
determine at least one adaptor for a particular one of the plurality of applications, wherein a priority of the at least one adaptor is specific to the particular application and determined based on prevalent settings of the cloud computing systems, wherein the at least one adaptor is part of a configurable sequence of adaptors that are each configured to receive, retrieve, or modify metrics, the configurable sequence of adaptors including at least a price adaptor that provides prices for cloud configurations and a workload adaptor that determines workloads of the cloud configurations, wherein the price adaptor obtains updated pricing for the cloud configurations by querying cloud providers or a database with dynamically updated real time cloud pricing information;

modify the real-time metrics information to obtain adapted metrics by applying the at least one adaptor to the real-time metrics information, including obtaining a subset of the real-time metrics information pertinent to an adaptor of the at least one adaptor, and applying a function associated with the adaptor to the subset of the real-time metrics information to obtain the adapted metrics; wherein the adapted metrics include latency information pertaining to the particular application on the at least one selected cloud configuration and a price-performance metric for the at least one selected cloud configuration is a Price-Performance index (PPI) calculated as an inverse of a combined latency and cost, where a cost for the at least one selected cloud configuration is based on at least one of the real-time metrics information, or the adapted metrics for the at least one selected cloud configuration;

compare the adapted metrics with base metrics for the particular application, wherein the base metrics indicate a set of prioritized acceptable runtime metrics for the particular application;

select, based on the comparison, the at least one cloud configuration from the adapted metrics, the selection being made by filtering out metrics in the adapted metrics that do not satisfy the base metrics; and execute, in response to the selection, computer-readable instructions corresponding to at least one cloud-specific implementation of a cloud-infrastructure independent representation of the particular application within the at least one selected cloud configuration, the cloud infrastructure independent representation being independent across the plurality of cloud computing systems.

12. The system of claim 11, wherein the at least one cloud-specific implementation of the distributed computing application corresponds to the at least one selected cloud configuration.

13. The system of claim 11, wherein the compiled metrics information for the plurality of sets of cloud configurations for deriving the adapted metrics comprise a cross-user compiled metrics information, the cross-user compiled metrics information being based on application profiles and application runs by a plurality of users on the plurality of sets of cloud configurations.

14. The system of claim 11, wherein the adapted metrics are used in a calculation of a price-performance metric for the at least one selected cloud configuration.

15. The system of claim 11, PPI is calculated as $$PPI = \frac{1}{latency * cost}.$$

16. The system of claim 11, wherein the base metrics comprise a maximum latency for running the distributed computing application, and the processor is further configured to:

update, for each of the plurality of sets of cloud configurations, latency information pertaining to the particular application on the at least one selected cloud configuration, based in part, on a current workload of the at least one selected cloud configuration included in the real-time metrics information.

17. The system of claim 11, wherein the processor is further configured to:

use the at least one adaptor in a configurable sequence of adaptors, wherein the adaptors perform operations based, in part, on one or more of the real-time metrics information or the adapted metrics.

18. The system of claim 11, wherein the at least one adaptor receives a portion of the real-time metrics information, and based on a configuration of the at least one adaptor, the at least one adaptor updates the adapted metrics using the portion of the real time metrics information.

19. A non-transitory computer readable medium comprising instructions, which when executed by a processor, perform steps in a method comprising:

obtaining real-time metrics information from a plurality of sets of cloud configurations of a corresponding plurality of cloud computing systems concurrently running a respective plurality of applications, wherein the real-time metrics information comprises real time pricing information and performance information for the plurality of sets of cloud configurations associated with the plurality of applications concurrently running;

determining at least one adaptor for a particular one of the plurality of applications, wherein a priority of the at least one adaptor is specific to the particular application and determined based on prevalent settings of the cloud computing systems, wherein the at least one adaptor is part of a configurable sequence of adaptors that are each configured to receive, retrieve, or modify metrics, the configurable sequence of adaptors including at least a price adaptor that provides prices for cloud configurations and a workload adaptor that determines workloads of the cloud configurations, wherein the price adaptor obtains updated pricing for the cloud configurations by querying cloud providers or a database with dynamically updated real time cloud pricing information;

modifying the real-time metrics information to obtain adapted metrics by applying the at least one adaptor to the real-time metrics information, including obtaining a subset of the real-time metrics information pertinent to an adaptor of the at least one adaptor, and applying a function associated with the adaptor to the subset of the real-time metrics information to obtain the adapted metrics, wherein the adapted metrics include latency information pertaining to the particular application on the at least one selected cloud configuration and a price-performance metric for the at least one selected cloud configuration is a Price-Performance index (PPI) calculated as $$PPI = \frac{1}{latency * cost},$$

where a cost for the at least one selected cloud configuration is based on at least one of the real-time metrics information, or the adapted metrics for the at least one selected cloud configuration;

comparing the adapted metrics with base metrics for the particular application, wherein the base metrics indicate a set of prioritized acceptable runtime metrics for the particular application;

selecting, based on the comparison, at least one cloud configuration from the adapted metrics by filtering out metrics in the adapted metrics that do not satisfy the base metrics; and executing, in response to the selection, computer-readable instructions corresponding to at least one cloud-specific implementation of a cloud-infrastructure independent representation of the particular application within the at least one selected cloud configuration, the cloud infrastructure independent representation being independent across the plurality of cloud computing systems.

20. The non-transitory computer readable medium of claim 19,
wherein the at least one cloud-specific implementation of the distributed computing application corresponds to the at least one selected cloud configuration.

21. The non-transitory computer readable medium of claim 19, wherein the real-time metrics information comprises cross-user metrics information, the cross-user metrics information being based on application profiles and application runs by a plurality of users on the plurality of sets of cloud configurations.

22. The method of claim 1, wherein the priority of the at least one adaptor corresponds to a position of the at least one adaptor within the configurable sequence of adaptors.

23. The non-transitory computer readable medium of claim 19, wherein the at least one adaptor includes a configurable sequence of adaptors, and the priority of the at least adaptor corresponds to the configurable sequence.

* * * * *

UNITED STATES PATENT AND TRADEMARK OFFICE
CERTIFICATE OF CORRECTION

PATENT NO. : 10,678,602 B2
APPLICATION NO. : 13/489223
DATED : June 9, 2020
INVENTOR(S) : Gaurav Manglik et al.

Page 1 of 1

It is certified that error appears in the above-identified patent and that said Letters Patent is hereby corrected as shown below:

In the Specification

In Column 4, Line 19, please amend as shown:
tain service-level agreements (SLAs), capability informa- Signed and Sealed this
Twenty-ninth Day of September, 2020

Andrei Iancu
*Director of the United States Patent and Trademark Office*